Figure 1:
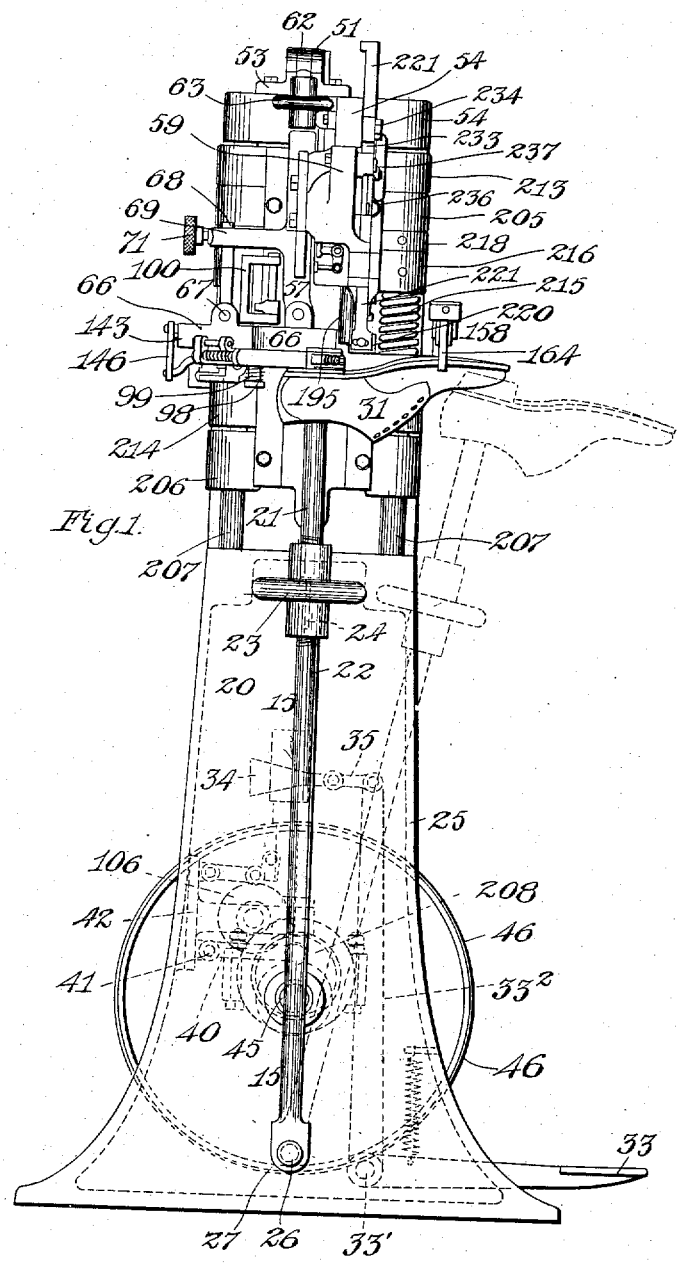

M. D. PHELAN.

MACHINE FOR BREASTING THE HEELS OF BOOTS AND SHOES.

APPLICATION FILED MAY 10, 1912.

Reissued Aug. 24, 1915.

13,972.

12 SHEETS—SHEET 1.

WITNESSES:
Beatrice J. Smith
Charles W. McDermott

INVENTOR
Merton D. Phelan
by Robt. P. Haine
atty.

COLUMBIA PLANOGRAPH CO., WASHINGTON, D. C.

M. D. PHELAN.

MACHINE FOR BREASTING THE HEELS OF BOOTS AND SHOES.

APPLICATION FILED MAY 10, 1912.

Reissued Aug. 24, 1915.

13,972.

12 SHEETS—SHEET 2.

WITNESSES
Beatrice J. Smith
Charles K. McDermott

INVENTOR
Merton D. Phelan,
by Robt. P. Haines atty.

COLUMBIA PLANOGRAPH CO., WASHINGTON, D. C.

M. D. PHELAN.

MACHINE FOR BREASTING THE HEELS OF BOOTS AND SHOES.

APPLICATION FILED MAY 10, 1912.

Reissued Aug. 24, 1915.

13,972.

12 SHEETS—SHEET 3.

WITNESSES:
Beatrice J. Smith
Charles K. McDermott

INVENTOR:
Merton D. Phelan,
by Robt. P. Hains
atty.

COLUMBIA PLANOGRAPH CO., WASHINGTON, D. C.

M. D. PHELAN.

MACHINE FOR BREASTING THE HEELS OF BOOTS AND SHOES.

APPLICATION FILED MAY 10, 1912.

Reissued Aug. 24, 1915.

13,972.

12 SHEETS—SHEET 4.

WITNESSES:
Beatrice J. Smith
Charles H. McDermott

INVENTOR.
Merton D. Phelan,
by Robt. P. Harris
atty.

COLUMBIA PLANOGRAPH CO., WASHINGTON, D. C.

M. D. PHELAN.

MACHINE FOR BREASTING THE HEELS OF BOOTS AND SHOES.

APPLICATION FILED MAY 10, 1912.

Reissued Aug. 24, 1915. 13,972.

12 SHEETS—SHEET 5.

WITNESSES:
Beatrice J. Smith
Charles K. McDermott

INVENTOR.
Merton D. Phelan,
by Robt. P. Hains,
atty.

COLUMBIA PLANOGRAPH CO., WASHINGTON, D. C.

M. D. PHELAN.

MACHINE FOR BREASTING THE HEELS OF BOOTS AND SHOES.

APPLICATION FILED MAY 10, 1912.

Reissued Aug. 24, 1915.

13,972.

12 SHEETS—SHEET 6.

WITNESSES:
Beatrice J. Smith
Charles K. McDermott

INVENTOR
Meton D. Phelan,
by Robt. P. Harris,
atty.

COLUMBIA PLANOGRAPH CO., WASHINGTON, D. C.

M. D. PHELAN.

MACHINE FOR BREASTING THE HEELS OF BOOTS AND SHOES.

APPLICATION FILED MAY 10, 1912.

Reissued Aug. 24, 1915.

13,972.

12 SHEETS—SHEET 7.

WITNESSES.
Beatrice J. Smith
Charles H. McDermott

INVENTOR.
Merton D. Phelan,
by Robt. P. Harris,
atty.

COLUMBIA PLANOGRAPH CO., WASHINGTON, D. C.

M. D. PHELAN.
MACHINE FOR BREASTING THE HEELS OF BOOTS AND SHOES.
APPLICATION FILED MAY 10, 1912.
Reissued Aug. 24, 1915.
13,972.
12 SHEETS—SHEET 8.
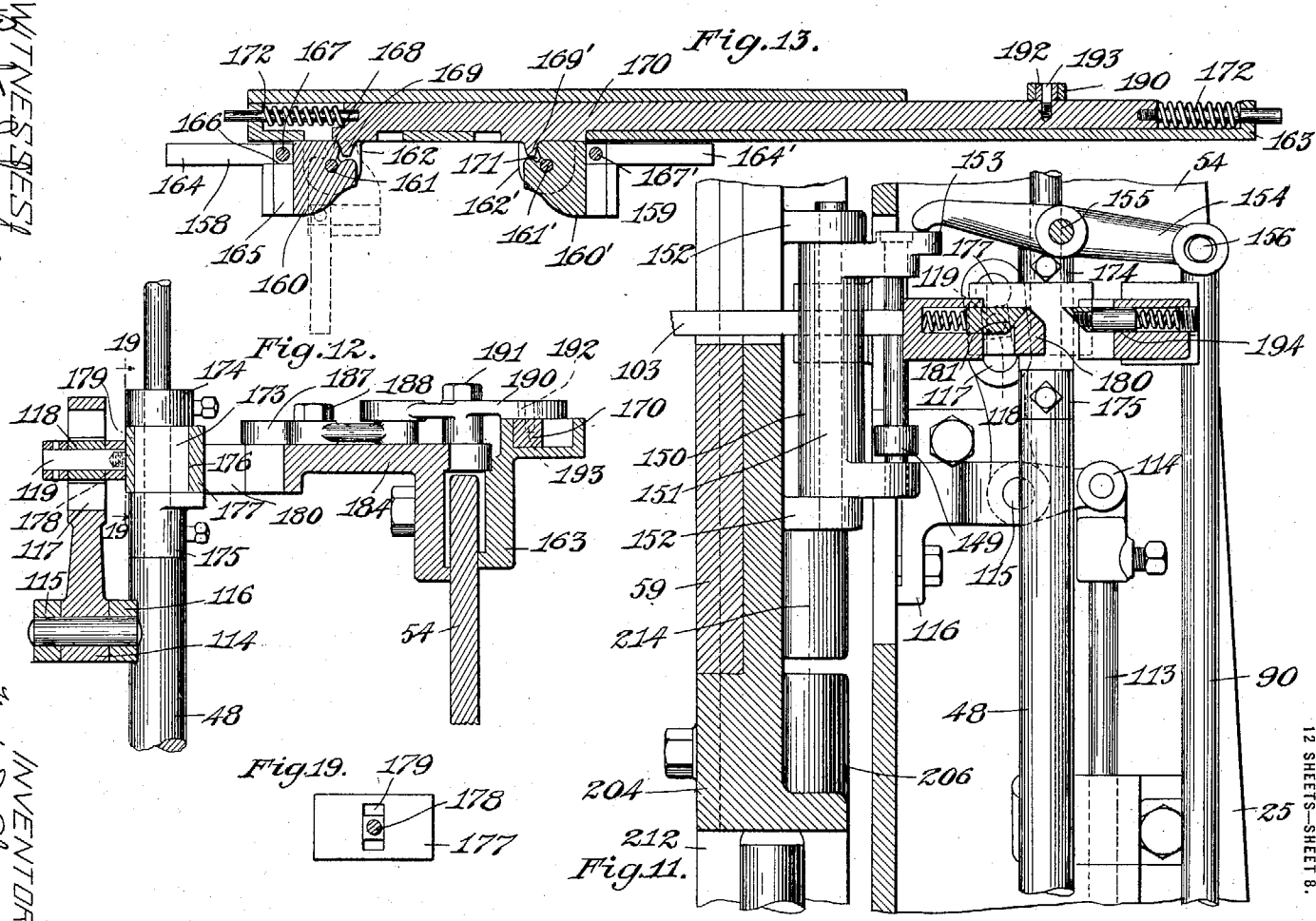
WITNESSES:
Beatrice J. Quirk
Charles H. McDermott
INVENTOR
Merton D. Phelan,
by Robt. P. Hains,
atty.
COLUMBIA PLANOGRAPH CO., WASHINGTON, D. C.

M. D. PHELAN.
MACHINE FOR BREASTING THE HEELS OF BOOTS AND SHOES.
APPLICATION FILED MAY 10, 1912.
Reissued Aug. 24, 1915.
13,972.
12 SHEETS—SHEET 9.
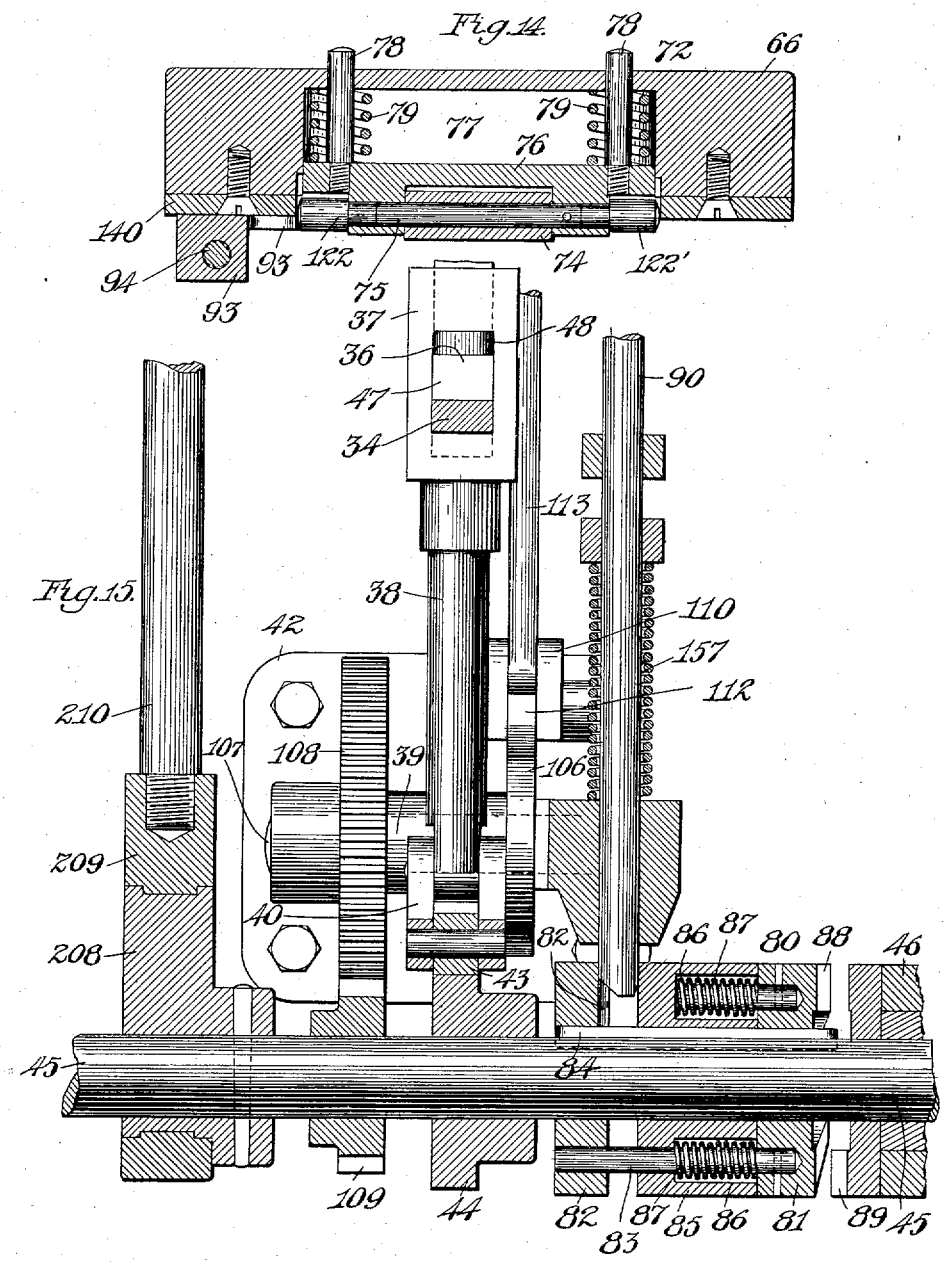
WITNESSES:
Beatrice J. Quick
Charles K. McDermott
INVENTOR.
Merton D. Phelan,
by Robt. G. Haines
atty.
COLUMBIA PLANOGRAPH CO., WASHINGTON, D. C.

M. D. PHELAN.

MACHINE FOR BREASTING THE HEELS OF BOOTS AND SHOES.

APPLICATION FILED MAY 10, 1912.

Reissued Aug. 24, 1915.

13,972.

12 SHEETS—SHEET 10.

WITNESSES:
Beatrice J. Smith
Charles K. McDermott

INVENTOR.
Mentor D. Phelan,
by Robt. A. Harris.
atty.

COLUMBIA PLANOGRAPH CO., WASHINGTON, D. C.

M. D. PHELAN.
MACHINE FOR BREASTING THE HEELS OF BOOTS AND SHOES.
APPLICATION FILED MAY 10, 1912.
Reissued Aug. 24, 1915. 13,972.
12 SHEETS—SHEET 11.
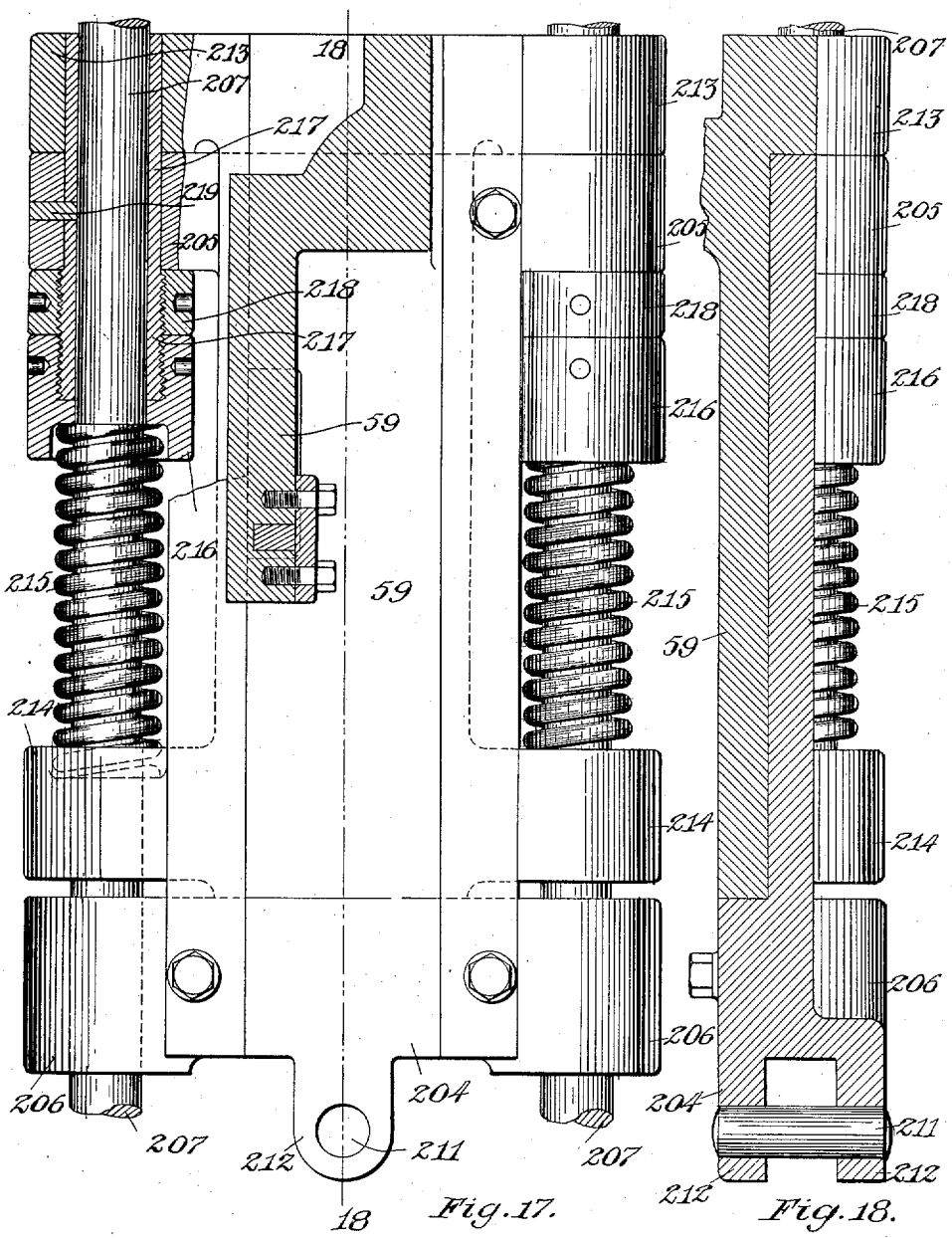
WITNESSES:
Beatrice J. Smith
Charles H. McDermott
INVENTOR
Merton D. Phelan,
by Robt. P. Stains,
atty.
COLUMBIA PLANOGRAPH CO., WASHINGTON, D. C.

M. D. PHELAN.
MACHINE FOR BREASTING THE HEELS OF BOOTS AND SHOES.
APPLICATION FILED MAY 10, 1912.
Reissued Aug. 24, 1915.
13,972.
12 SHEETS—SHEET 12.
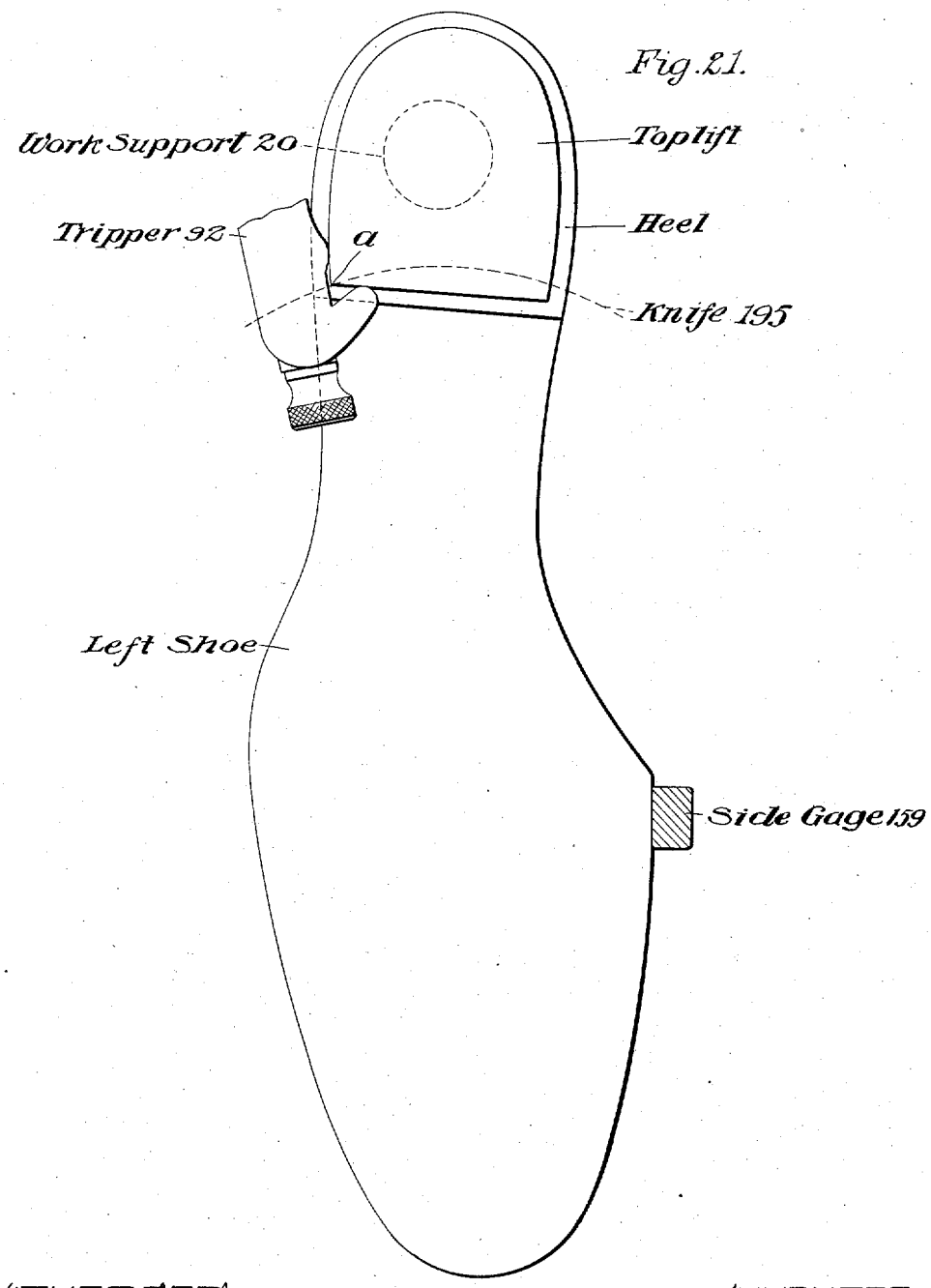
WITNESSES:
Beatrice J. Smith
Charles W. McDermott
INVENTOR
Merton D. Phelan,
by Robt. G. Strains
atty.
COLUMBIA PLANOGRAPH CO., WASHINGTON, D. C.

UNITED STATES PATENT OFFICE.

MERTON D. PHELAN, OF BOSTON, MASSACHUSETTS, ASSIGNOR TO UNITED SHOE MACHINERY COMPANY, OF PATERSON, NEW JERSEY, A CORPORATION OF NEW JERSEY.

MACHINE FOR BREASTING THE HEELS OF BOOTS AND SHOES.

13,972. Specification of Reissued Letters Patent. Reissued Aug. 24, 1915.

Original application filed September 4, 1906, Serial No. 333,170. Renewed April 12, 1910, Serial No. 554,961. Original No. 958,005, dated May 17, 1910. Application for reissue filed May 10, 1912. Serial No. 696,426.

*To all whom it may concern:*

Be it known that I, MERTON D. PHELAN, a citizen of the United States, residing at Boston, in the county of Suffolk and State of Massachusetts, have invented new and useful Improvements in Machines for Breasting the Heels of Boots and Shoes, of which the following is a specification.

This invention relates to machines for operating upon the bottoms of boots and shoes, and more particularly to machines for acting upon heels. For purposes of illustration, the invention will be described as embodied in a heel breasting machine.

The invention is designed to provide a machine of the general character above suggested which shall be of improved construction, simple, efficient and accurate in operation.

One practicable manner in which these objects may be attained will more fully appear in the succeeding specification, which describes an illustrative machine embodying the various features of the invention, collectively considered. The specific illustrative machine just referred to is shown in the accompanying drawings.

Figure 2:
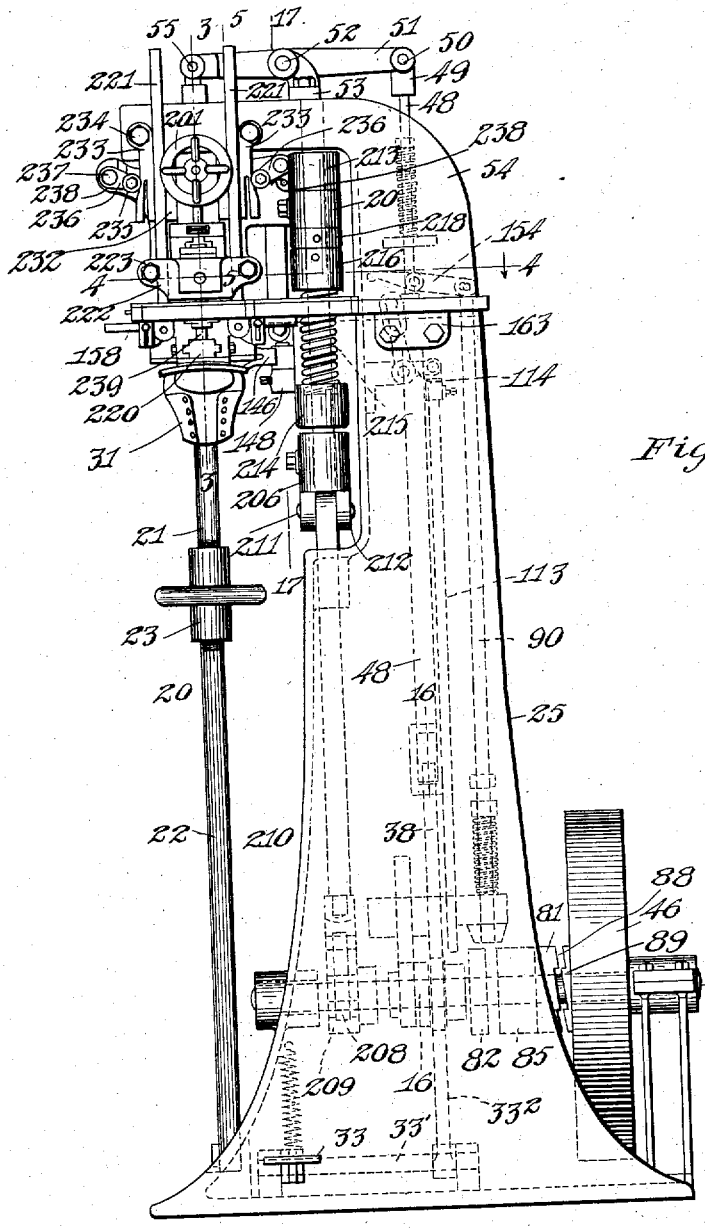
Figure 3:
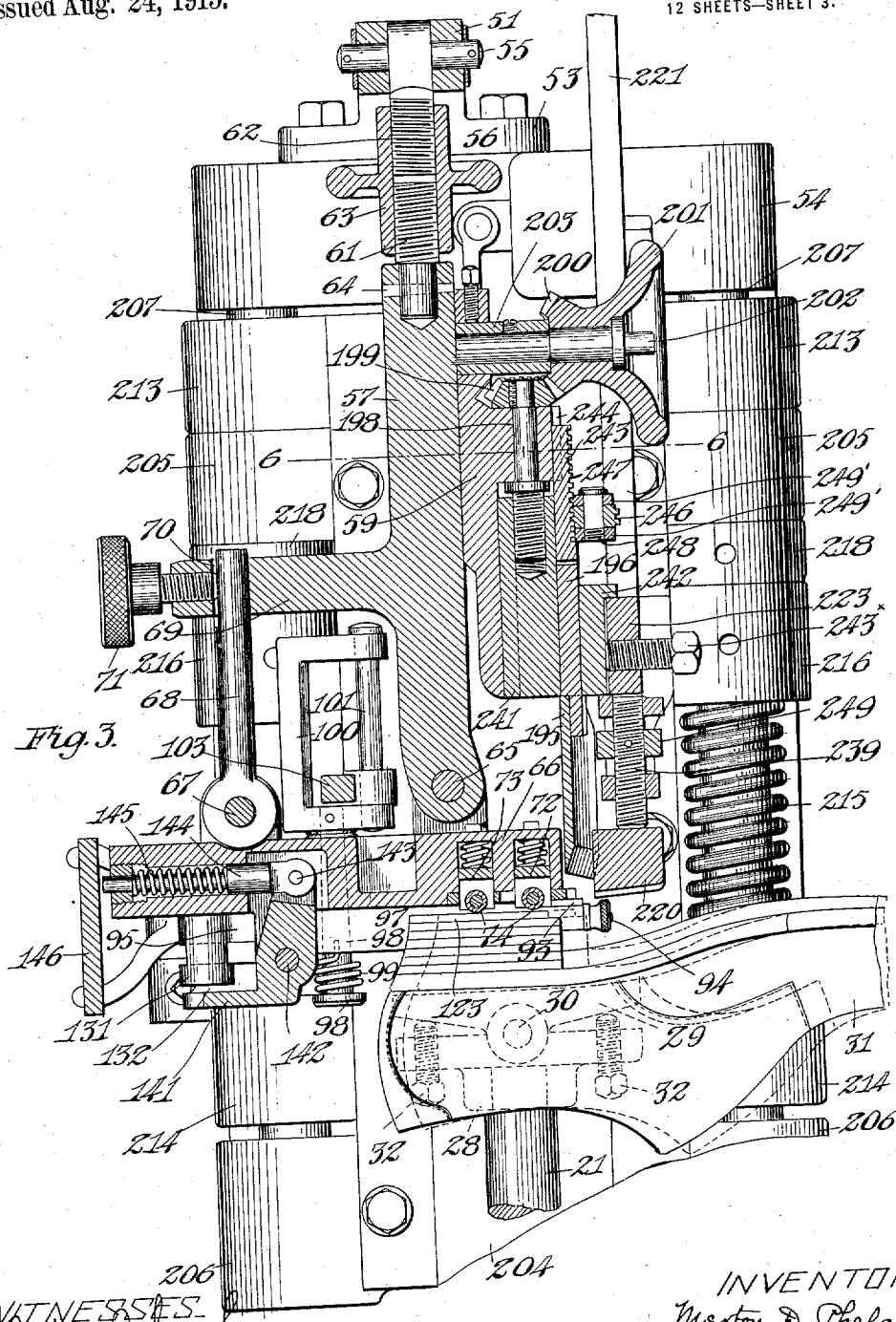
Figure 4:
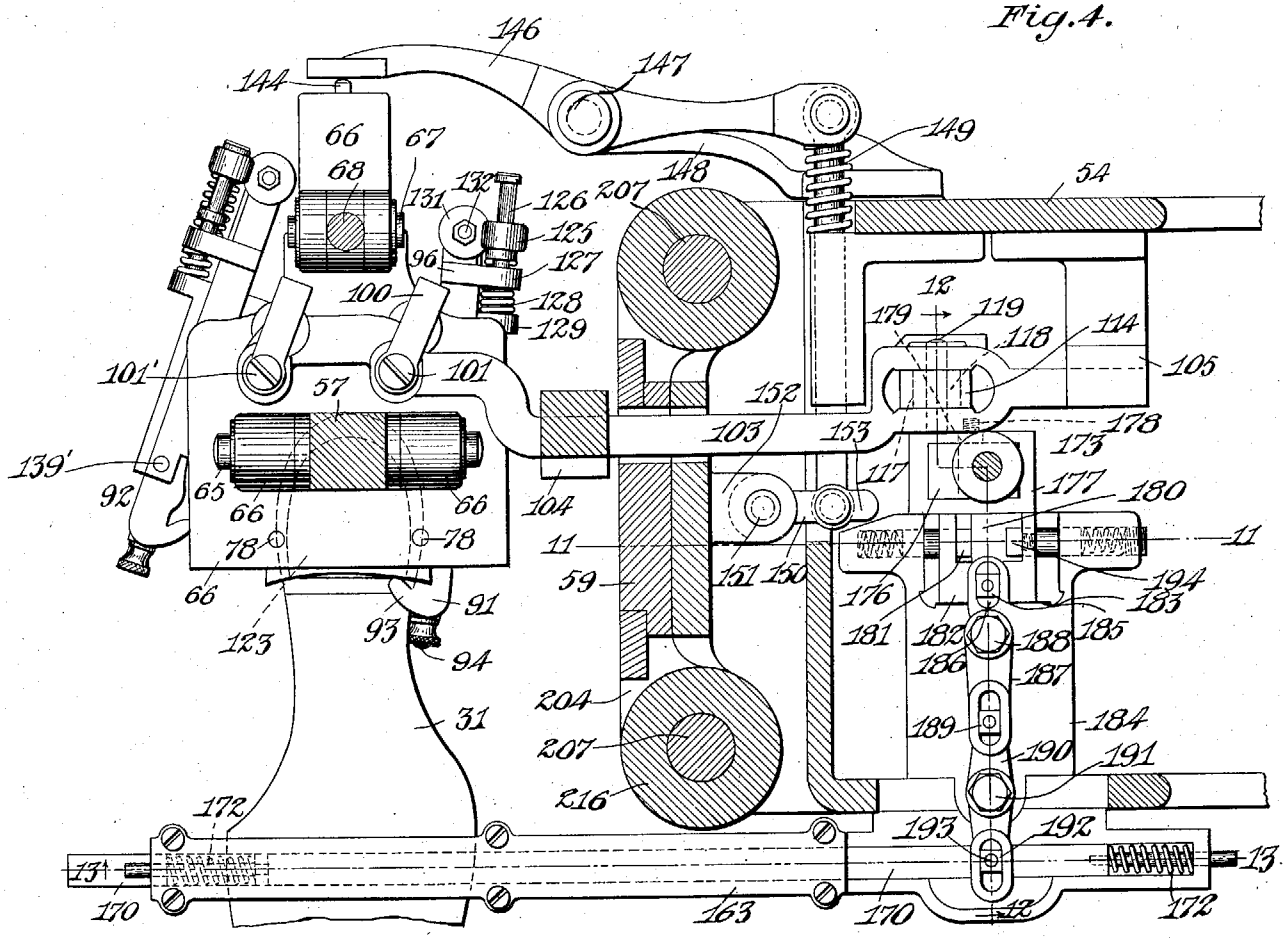
Figure 5:
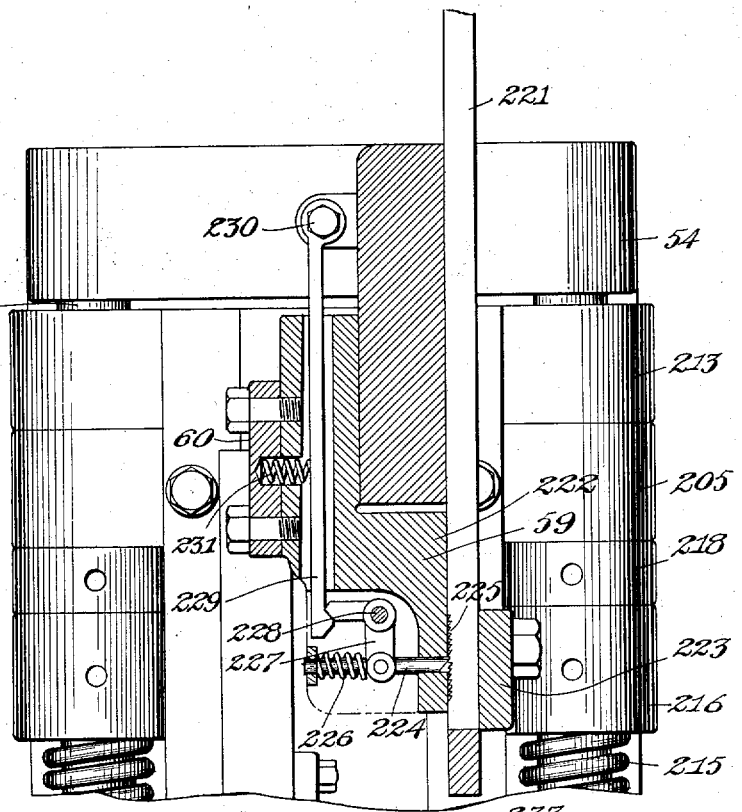
Figure 6:
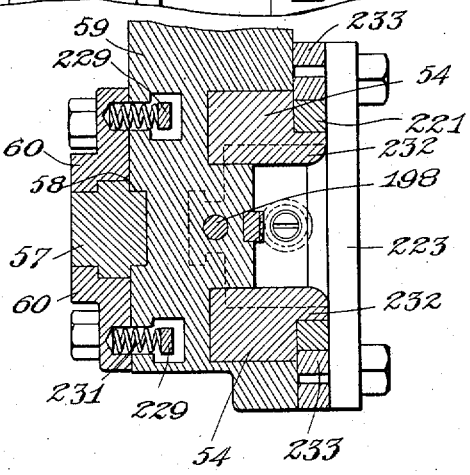
Figure 20:
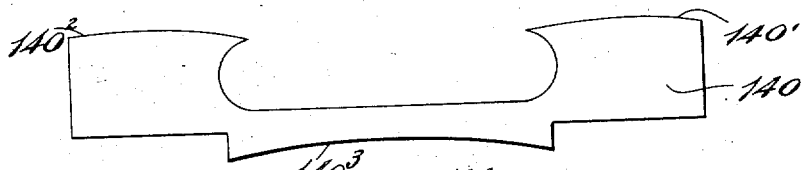
Figure 7:
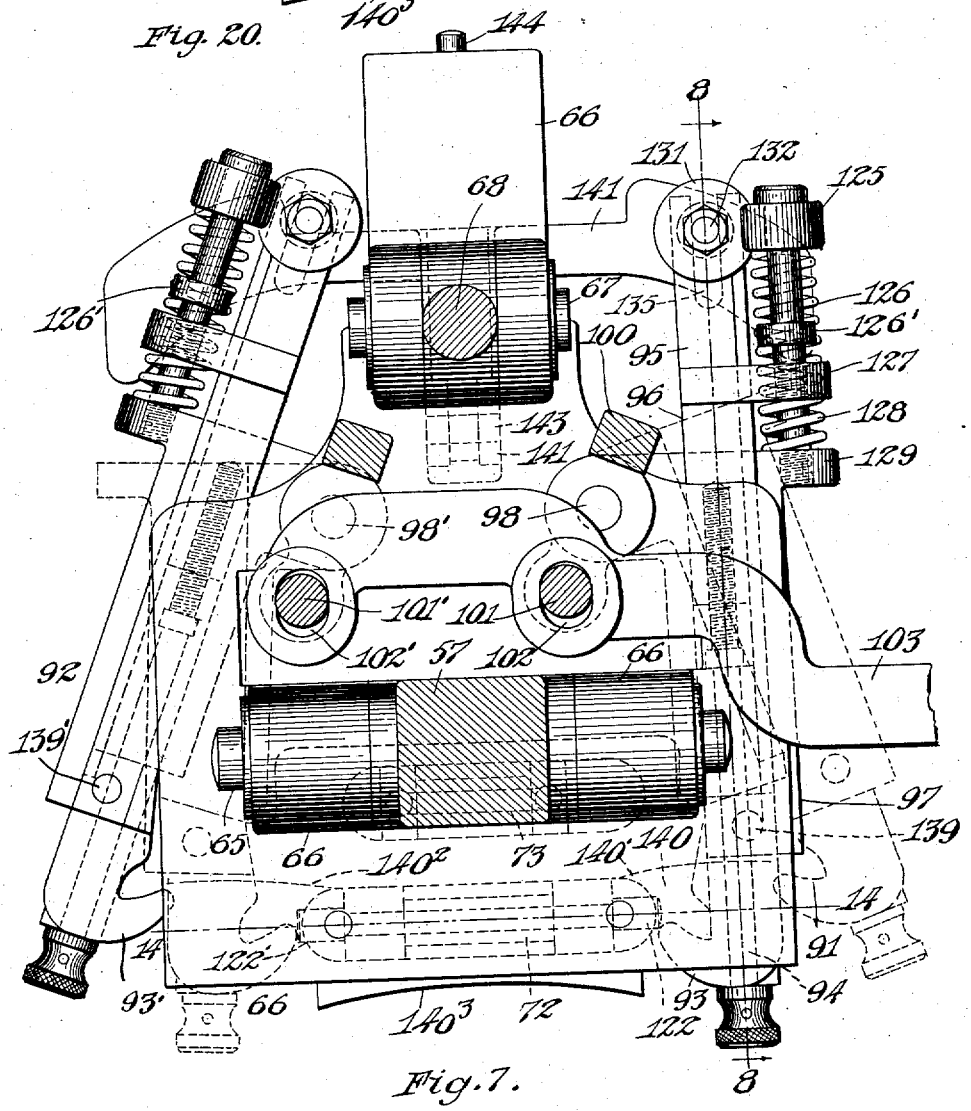
Figure 8:
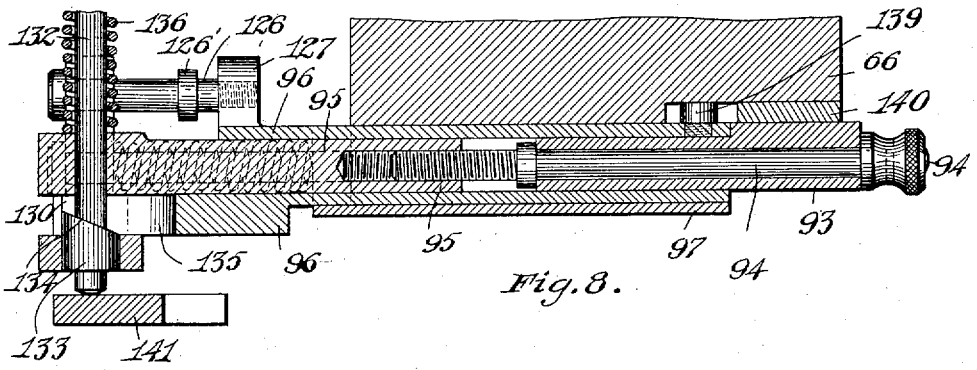
Figure 9:
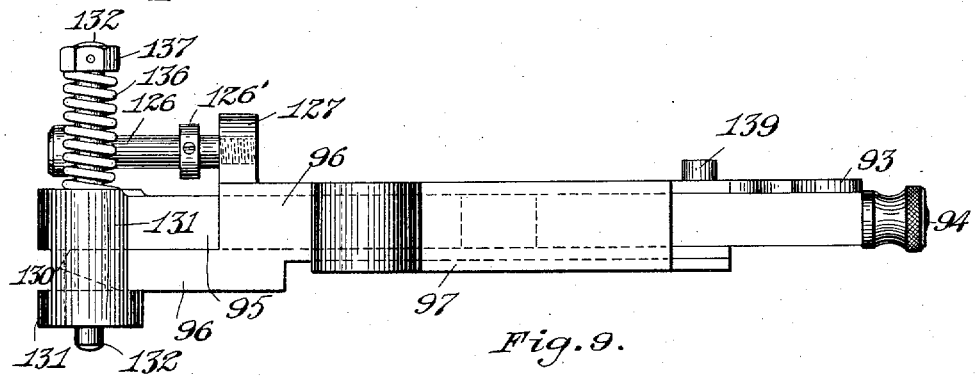
Figure 10:
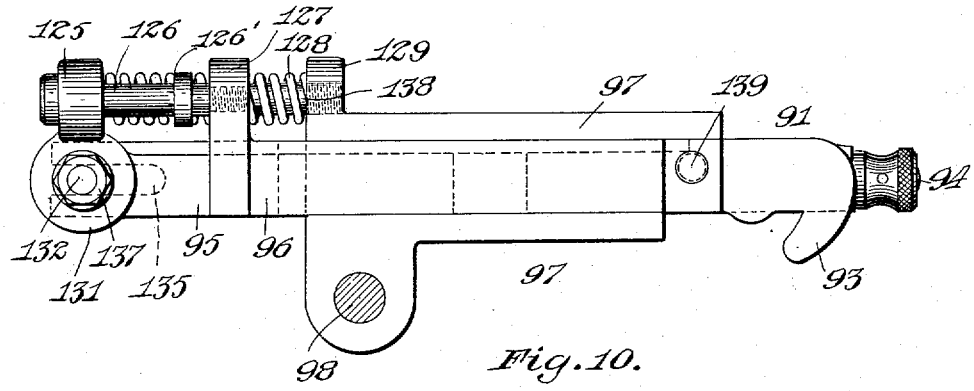
Figure 16:
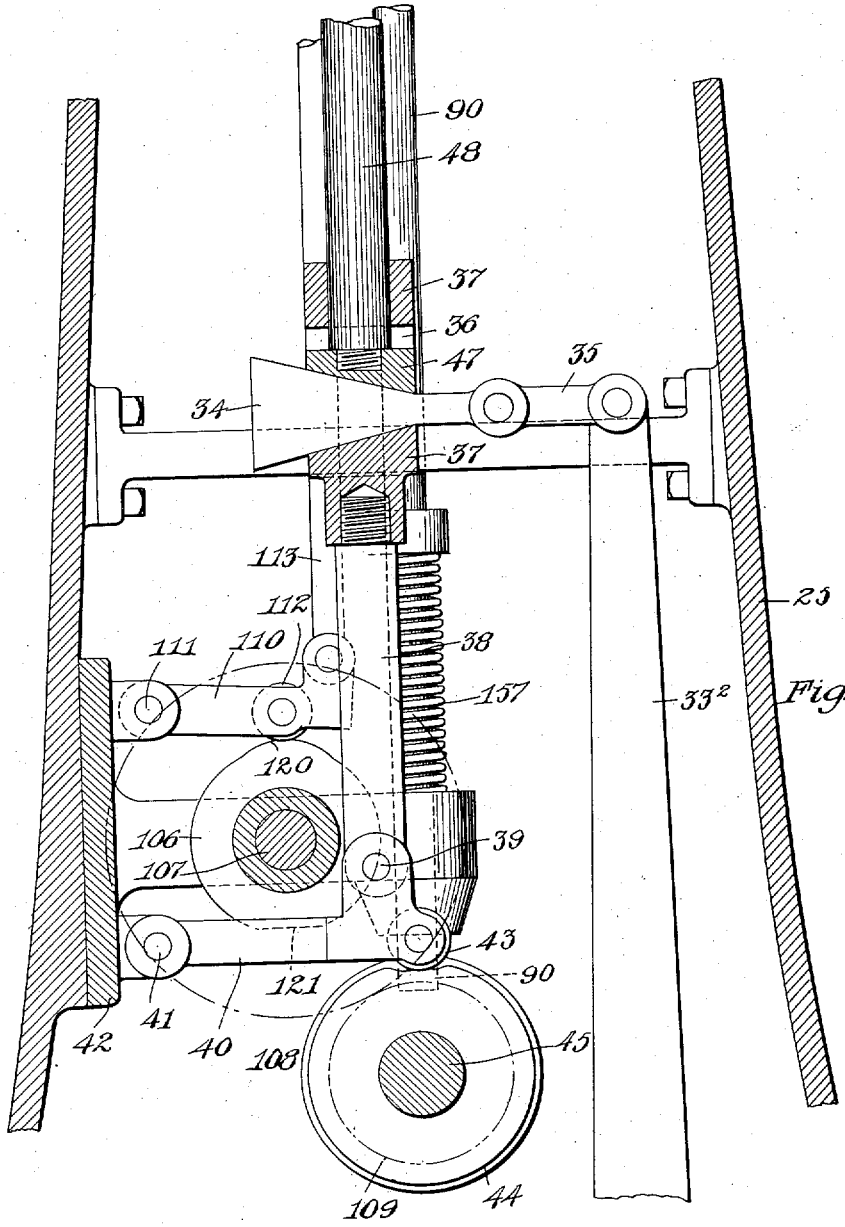

In the drawings:—Figure 1 is a side elevation of the illustrative machine, showing in full lines a shoe in position to be operated upon, and in dotted lines the work support in its shoe receiving position; Fig. 2 is a front elevation of the machine shown in Fig. 1; Fig. 3 is a vertical section (partly in elevation) on a plane extending from front to rear of the machine indicated by the line 3—3 of Fig. 2; Fig. 4 is a horizontal section on a line 4—4 of Fig. 2; Fig. 5 is a vertical, detail section on a line 5—5 of Fig. 2, as viewed from the left in Fig. 2; Fig. 6 is a horizontal section on the line 6—6 of Fig. 3; Fig. 7 is an enlarged plan (partly in section) of the trippers shown at the left of Fig. 4; Fig. 8 is a section on the line 8—8 of Fig. 7, looking toward the right in the latter figure; Fig. 9 is a side elevation of the parts shown in Fig. 8; Fig. 10 is a plan view of the parts shown in Figs. 8 and 9; Fig. 11 is a vertical section, crosswise the machine on a line 11—11 of Fig. 4; Fig. 12 is a vertical section on the line 12—12 of Fig. 4; Fig. 13 is a vertical section, crosswise the machine, on a line 13—13 of Fig. 4; Fig. 14 is a vertical section on the line 14—14 of Fig. 7; Fig. 15 is a vertical section through the axis of the main shaft of the machine on the line 15—15 of Fig. 1, looking toward the left in the latter figure; Fig. 16 is a vertical section from front to rear of the machine on a line 16—16 of Fig. 2, looking toward the right in the latter figure; Fig. 17 is a detail elevation showing a knife-carrying slide in section on the line 17—17 of Fig. 2; Fig. 18 is a section on the line 18—18 of Fig. 17; Fig. 19 is a detail section on a line 19—19 of Fig. 12; Fig. 20 is a detached plan view of a tripper stop plate shown in dotted lines in Fig. 7; Fig. 21 is a diagrammatic view showing a shoe and the relation thereto of the trippers and side gages.

Referring to Figs. 1 and 2, the shoe to be operated upon is sustained in inverted position upon a pivoted work support 20; and when properly adjusted is acted upon by a vertically reciprocating tool. Such adjustment as may be required in the specific machine to determine the proper relation of tool and work, is effected by moving the work. The work support 20 consists of a standard in two parts, 21 and 22, connected by an adjusting nut 23, engaging right and left threads on the respective parts, which are rendered relatively non-rotatable by a spline 24 (Fig. 1) on the part 21, in sliding engagement with an axial recess on the other part. The work support 20 is pivoted by a stud 26 to the machine base 25; and the lower extremity of the support, being appropriately rounded, fits in a segmental recess 27 of the base 25 and bears against the latter so as to transmit pressure exerted upon the shoe, directly to the base.

As shown in Fig. 3, the upper extremity of the work support 20 has a head 28, to which is secured a jack block 29 on a pivot 30. This pivot 30 permits the shoe 31 to be rocked so as to change the vertical plane angle between the breast and the vertically moving tool and thereby to determine the tread-angle to be formed by the breasting operation. The rocking of the jack block 29 may be prevented, limited or adjusted by means of screws 32—32, carried in the head 28.

The shoe is placed upon the work support when the latter occupies the position indicated by dotted line in Fig. 1. Thereafter the support and the shoe are moved rearwardly beyond the proper operative position of the shoe in order to permit certain positioning devices to be introduced in front of the heel breast; and when this has been effected the shoe is moved forwardly to the full line position shown in Fig. 1. The preliminary position after the shoe has been pushed back is shown in full lines in Fig. 3; and the operative position of the shoe after it has been moved forward again is shown in dotted lines in Fig. 3. When the work stands in preliminary position, it is sustained from beneath by the work support and at this time it is desirable for the purposes of the specific illustrative machine to engage the heel of the shoe from above. Accordingly, the operator moves a presser foot down against the tread face of the heel to hold the shoe more or less firmly between the presser foot and work support. The presser foot is operated by means of a treadle 33, shown in Figs. 1 and 2.

Referring now to Figs. 1, 15 and 16, the treadle 33 is a bell crank, fulcrumed upon a treadle shaft 33′ and comprises an arm $33^2$ the upper extremity of which is connected by a link 35 to a horizontally sliding wedge 34. The wedge 34 extends through a slot 36 in a yoke 37, fixed at the upper end of a vertical link 38 which is pivoted at its lower end by a pin 39 to a cam lever 40. The cam lever 40 is fulcrumed at 41 to a bracket 42 on the machine frame, and has at its outer end a cam roll 43 to engage a presser foot cam 44, fixed upon the main shaft 45 of the machine. The shaft 45 is suitably journaled in the machine base 25 and is driven through the agency of a clutch pulley 46 (Fig. 15). The lower face of the wedge 34 bears against a correspondingly inclined surface upon the yoke 37; and the upper face of the wedge engages a block 47 fixed at the lower end of a presser foot rod 48, said block 47 being arranged to slide vertically in the slot 36 of the yoke 37. Thus, when the operator depresses his treadle, the wedge 34 is moved to the right in Fig. 16, and the presser foot rod 48 is elevated.

Referring now to Fig. 2, the presser foot rod 48 has at its upper extremity a bifurcated block 49, embracing one end of a lever 51, which is pivoted thereto at 50. The lever 51 is fulcrumed at 52 upon a bracket 53, projecting from the machine head 54. The lever 51 is also pivoted by a pin 55 (see Fig. 3) to an adjustable link 56, fixed at its lower end to the presser foot plunger 57. Thus, when the lever 51 is rocked the plunger 57 is vertically moved in ways 58 (Fig. 6) formed in the breasting tool slide 59, the presser foot plunger being held in the ways 58 by cap plates 60, 60, fastened to the slide 59.

Referring again to Fig. 3, the adjustable link 56 comprises two oppositely threaded screws 61 and 62, engaged by an adjusting nut 63, thus providing for vertical adjustment of the presser foot plunger 57 with relation to the throw of the lever 51. The screw 61 is connected to the plunger 57 by means of a pin 64; and the lower extremity of the plunger 57 is pivotally connected by a pin 65 to a presser foot 66. The presser foot 66 is further connected to the plunger 57 by being pivoted at 67 to a rod 68, projecting upwardly from the presser foot and entering an aperture 70 in an arm 69 of the plunger 57. By moving the rod 68 vertically the presser foot 66 is rocked about its pivot 65 at the lower end of the plunger 57, and thus the presser foot may be adjusted at any practicable angle to the horizontal. The presser foot may be secured in adjusted position by means of a set screw 71, threading into the end of the arm 69 of the plunger 57.

Fig. 14 is a transverse vertical section (partly in elevation) of the presser foot, on a plane located just to the right of the plunger 57 as it is viewed in Fig. 3.

Referring now to Figs. 3 and 14 in the front end of the presser foot 66 are mounted two yielding pressers 72, 73. Since these two pressers are substantially alike it will suffice to describe one of them. As shown in Fig. 14, a roll 74 is loosely journaled upon a shaft 75, fixed in a vertically sliding block 76, arranged to retreat upwardly into a recess 77 in the presser foot 66. The block 76 has fixed in it two pins 78—78 which project upwardly through the presser foot 66 and are encircled within the recess 77 by springs 79, tending constantly to press the block 76 and the presser roll 74 downwardly toward the shoe.

When the operator depresses the treadle and thereby moves the presser foot down against the tread face of the heel, (the latter being then in its preliminary position) the presser rolls 74 first strike against the heel, and then upon further descent of the presser foot the rolls retreat upwardly, maintaining pressure upon the heel but at the same time permitting movement of the shoe from its preliminary position to its operative position.

When the presser foot has been depressed by the operator as above described, it is next desirable to move the shoe from preliminary position to operative position, and this movement is utilized, preferably in its later stages, for starting the power operation of the machine. After the machine has started with the shoe in operative position the presser foot cam 44 acts through the link 38 and rod 48 to force the presser foot firmly against the heel; and preferably this firm engagement continues during the entire breasting operation so as to grip the heel securely in adjusted position between the presser foot and work support.

It has been stated that the machine is started by moving the shoe between preliminary and operative position, but before considering the immediate effect of this movement of the shoe, it is expedient preliminarily to describe a convenient form of clutch such as is used on the specific illustrative machine. Reference may be had to Fig. 15, which is a sectional view drawn on the vertical plane of the axis of the main shaft 45. The shaft has a loose belt pulley 46, which is restrained against axial movement and has upon its hub one member of a positive clutch. A sliding member 80 of the clutch consists of two collars 81 and 82, rigidly connected by a pin 83, each of said collars being splined to the shaft 45 so as to be axially movable thereon. Interposed between the collars 81 and 82 is a collar 85, rigidly fixed to the shaft, the pin 83 passing loosely therethrough. In the fixed collar 85 are provided recesses 86, 86, in which are mounted springs 87, 87, which tend constantly to force the sliding collars 81, 82, toward the right in Fig. 15, to throw the clutch into driving engagement by meshing the teeth 88 on collar 81 with teeth 89 mounted on the hub of the belt pulley 46. The sliding clutch member 80 is held normally out of engagement (against the tension of the springs 87, 87) by means of a shipper rod 90, the lower extremity of which is arranged to project between the fixed collar 85 and the sliding collar 82. A spring 157 encircling the shipper rod 90 tends constantly to elevate the latter and permit engagement of the clutch; but said spring is normally opposed by devices which are released to start the machine, upon movement of the work from preliminary to operative position. This release is accomplished through the agency of two trippers 91 and 92 (Fig. 7) arranged alternately to engage the breasts of right and left shoes, and to accompany said shoes forwardly during their movement to operative position. The manner in which the trippers are associated with shoes will be described first before explaining the manner in which they serve to release the shipper rod 90 to permit the action of spring 157.

For the purposes of the particular machine under discussion the trippers 91 and 92 operate alternately and each when operative performs two offices—a clutch releasing office serving to start the machine, and a work positioning office serving to locate a corner of a heel in proper vertical alinement with the specific form of vertically acting breasting tool. It is preferred that each tripper perform its two offices in a more or less definite time relation such that the machine shall not be started early enough to initiate the breasting operation before the work positioning office has been discharged. When such a time relation prevails, it insures that the heel shall be correctly positioned before the breasting commences. The work positioning office will be explained first.

Fig. 21 illustrates diagrammatically the manner in which the tripper 92 engages the breast of a toplift at one corner in order to position the latter in the line of the knife 195. It has been stated that the tripper partakes of the endwise movement of the shoe as the latter passes from preliminary to operative position, the hook of the tripper being latched over the breast of the toplift so as to be drawn forward therewith. In order to define the extent of this movement of the shoe and tripper, provision is made for positively arresting the tripper whereby the shoe is also arrested, the tripper hook still engaging the toplift. The devices for arresting the tripper are adjusted so that the tripper and shoe shall be brought to a standstill just as the toplift corner *a* adjacent the tripper, reaches a position beneath the knife 195. Thus the specific form of tripper serves definitely to position the corner and thereby contributes to present the heel in its proper relation to the breasting tool. During all this time the other tripper 91 remains in inoperative position and hence it may be disregarded for the present. As shown in Fig. 21, but one corner of the heel is engaged; and this leaves the shoe comparatively free to swing horizontally so as to vary the median angle of the breast (*i. e.* the angle between the breast and longitudinal median line of the heel). To assist in determining any desired median angle an adjustable side gage 159 is provided to limit the horizontal swing of the shoe. The gage 159 will be the subject of a full description hereinafter.

A left shoe is represented in Fig. 21; and the tripper 92 is shown as engaging the left hand or outside corner of the toplift. It is customary to shape heels so that the outer breast corner shall stand nearer the shoe toe than the inner corner. For this reason it is preferred to have the tripper 92 locate the outside breast corner in line with the knife 195; and to swing the shoe upon substantially that corner as a pivot until the proper median angle has been described whereupon further swing will be obstructed by the side gage 159.

The preceding description of the tripper 92 is applicable also to the other tripper 91 which acts upon the outer corner of a right heel and coöperates with a side gage on the opposite side of the shoe. Since it is the usual practice to breast right and left shoes alternately the specific machine is arranged to introduce the trippers 91 and 92 alternately into operative position.

In Fig. 7 the tripper 91 is shown in its proper position to coöperate with a right shoe; the tripper 92 being then withdrawn from its active position. Since the two trippers are substantially alike both in construction and mode of operation, the following description of the tripper 91 will be understood as applying equally to the tripper 92.

Referring to Figs. 8, 9 and 10, the tripper 91 is shown detached. It comprises a hook 93, adjustably connected by a screw-threaded rod 94 to a tripper shank 95, the hook and shank being mounted to slide together endwise in a casing 96. The casing 96 is also arranged to slide endwise with the hook and shank, in a tripper frame 97. The frame 97 is mounted on a pin 98 (Figs. 7 and 10) and said pin is journaled in the presser foot 66. With this arrangement, the holder 97 is adapted to rock with its pin 98 between the dotted-line inoperative position on the right of Fig. 7 to the full line operative position. As shown in Fig. 3, the lower end of the pin 98 is encircled by a coil spring 99, one end of which is connected to the holder 97 and the other end of which is fastened to the lower extremity of the pin. Thus the spring 99 tends constantly to rock the entire tripper and its mounting, clockwise in Fig. 7—that is to say, the tripper tends normally to move into operative position.

It will be understood that the trippers themselves are positioned and operate beneath the presser foot, as illustrated in Fig. 3; but the pin 98 journaled in the presser foot, projects upwardly through the latter and constitutes the axial shaft of a yoke 100 fixed thereto (Fig. 3). By means about to be described, the yoke 100 is rocked about the vertical axis of the pin 98, to turn said pin and move its associated tripper out of operative position; and thereafter the yoke is turned in the opposite direction to permit the spring 99 to throw the tripper into operative position. Referring again to Fig. 3, the extremities of the yoke are connected by a stud 101, to which is applied the power for rocking the yoke to the ends just suggested. As shown in Fig. 7, the studs 101 and 101′, for the respective yokes, each passes through a slot in a tripper shifter 103, shown in cross section in Fig. 3. When the tripper shifter 103 is moved longitudinally (from left to right, and vice versa in Fig. 7), the trippers are thrown alternately into and out of operative position. Also, at intervals, the shifter 103 occupies an intermediate position such that neither tripper is in operative position. As shown in Fig. 4, the tripper shifter 103 is arranged to slide endwise rectilinearly in bearings 104, 105. The movements of the tripper shifter 103 are actuated from the main shaft.

Referring now to Figs. 16 and 17, the shifter 103 is actuated through the agency of a shifter cam 106, fixed upon an auxiliary shaft 107, which is driven through a gear 108, fast thereto, by a gear 109, fixed upon the main shaft 45. The ratio of the gears 108 and 109 is such that the auxiliary shaft rotates once while the main shaft rotates twice. The cam 106 acts upon a roll 112, mounted upon a cam lever 110, fulcrumed at 111 to the bracket 42. Pivoted to the cam lever 110 is a shifter rod 113, which (see Fig. 11) is connected at its upper extremity with one arm of a bell-crank 114 fulcrumed at 115 to a bracket 116 on the machine frame. The vertical arm of the bell-crank 114 has a slot 117 into which projects a block 118, journaled upon a pin 119, fixed in the tripper shifter 103. Thus, when the shifter rod 113 is vertically reciprocated by the shifter cam 106, the tripper shifter 103 is reciprocated endwise horizontally to move the trippers alternately into and out of operative position.

By reference to Fig. 16, it will be noted that the shifter cam 106 has a rise 120 and a depression 121, the remainder of the cam being a uniform dwell. The action of this cam, when communicated to the tripper shifter 103, will effect shifts between two opposite limits determined respectively by the rise and the depression on the cam; and in the intervals between the shifts the tripper shifter will occupy an intermediate position. Since the rise 120 and the depression 121 are diametrically disposed on the cam 106, and since the auxiliary shaft 107 with the cam is rotated at uniform speed, it follows that the trippers will be moved into operative position in alternation at uniform intervals, one being withdrawn and another presented by each half revolution of the auxiliary shaft. When the machine has completed a breasting operation, it comes to rest with the cam roll 112 engaging one or the other of the rise 120 or depression 121 so that whenever a shoe is introduced to the machine it will find one of the trippers in operative position. After the heel has been properly adjusted with relation to the breasting tool it is desirable that the tripper be withdrawn in order to remove it from possible interference with the movement of the breasting tool; and to this end the tripper cam 106 is so timed that its dwell becomes operative soon after the machine starts and before the breasting begins, and thereby moves the tripper shifter into intermediate position. This swings the recently acting tripper away from the heel and there holds it until, just as the machine stops, the shifter 103 is moved farther to present the other tripper for the next shoe.

When the tripper 91 occupies the position shown in Fig. 7, the extreme end of the hook 93 is pressed by the spring 99 (Fig. 3) against a pin 122, mounted in the sliding block 76, as shown in Fig. 14. By this engagement with the pin 122, the hook 93 is restrained from entering completely into its operative position until the pin 122 retreats from engagement with the hook, when the presser foot is seated against the tread of the heel. Thereupon, the hook 93 is moved over by its spring 99 and takes position in front of the heel breast.

The hook 93 of the tripper reaches its position in front of the heel breast while the shoe stands yet in its preliminary position. It remains then for the operator to draw the shoe forward to operative position; and in so doing the heel will, through the hook 93, move the tripper forward until, as will be presently described, the movement of the tripper is finally arrested, thereby also arresting the shoe and as already described, determining in part the position of the heel breast in relation to the breasting tool. In the specific machine shown in the drawings the hook 93 is of such dimensions that it engages only the toplift 123 and, hence, the final arrested position of the hook determines the position of the toplift with relation to the breasting tool. This is preferable for the reason that the toplift is usually given substantially its finished form before application to the heel, and is located on the latter in the position which it is desired to have upon the finished shoe. Thus the toplift may serve in the capacity of a pattern, whereby the heel may be properly adjusted to the breasting tool.

Referring now to Figs. 8, 9 and 10, it will be observed that forward movement of the hook 93, as it accompanies the shoe to operative position of the latter, will also move the tripper-shank 95 endwise. This movement of the shank 95, during a portion of its extent, is utilized for throwing the clutch and starting the machine in a manner about to be explained.

The shank 95 has an integral ear 125 (Fig. 10) which receives and slides upon a stud 126, fixed to an ear 127 integral with the casing 96. A stop collar 126′ on the stud 126 limits the movement of the ear 125—and consequently of the shank 95—to the right with relation to the casing 96. A spring 128 bears at one end against the ear 125 and, at its other end, against an ear 129 integral with the tripper frame 97; and this spring tends to move the shank 95 to the left in Fig. 10 and to oppose movement of the hook 93 as it accompanies the movement of the shoe. The spring 128 encircles a stud 138, fixed in the ear 129. A bifurcated extension 135 of the casing 96 extends to the left in Fig. 8 and enters a slot 130 in a cylindrical portion 131 of the shank 95. Mounted in said cylindrical portion so as to slide vertically therein is a pin 132, bearing near its lower extremity a collar 133, having a beveled cam surface 134. The cam surface 134 coöperates with a similarly beveled surface upon the under side of the bifurcations 135 of the casing 96. A spiral spring 136 is interposed between a nut 137 fast to the pin 132 and the top of the shank 95; and serves to hold the cam face 134 yieldingly up against the coöperating cam on the casing 96. During the movement of the shoe into operative position, the shank 95, carrying with it the cam 134, accompanies the shoe throughout its entire movement; while during the latter part of said movement the casing 96 is arrested, thereby causing the cam faces on the bifurcations 135 to become stationary while the cam 134 continues to move through a short distance. This continued movement of the cam 134 serves to depress the pin 132 against the tension of the spring 136 and this downward movement of said pin—taking place just as the shoe reaches its final operative position—acts to throw the clutch and start the machine. The arrest of the casing 96 referred to is effected through the agency of a lug 139, fixed in the casing 96, which, during the forward movement of the casing abuts against a stop face on a plate 140, secured to the under face of the presser foot 66. The plate 140, is shown detached in plan view in Fig. 20 (Sheet 6). The stop faces for the lugs 139 and 139′ on the respective casings for the trippers 91 and 92, are indicated at 140′ and $140^2$. The plate 140 has also a curved face $140^3$. The latter has the same curve as the breasting knife and, consequently, has the same curve as the breast of the heel when finally shaped. The plate 140 is secured to the presser foot so as to be readily removable to be replaced by other plates, differently curved to suit various classes of work. In assembling a plate 140 with the presser foot, the operator may place the curved edge $140^3$ against the back of the knife and he may thus ascertain two important circumstances; that the plate 140 and the breasting knife are appropriate to each other, which will be evidenced by their curves coinciding; and that they are properly adjusted to each other, which will be evidenced by a proper symmetrical relation between them.

It will be noted that the curved stop faces 140′ and $140^2$ have characteristic shapes, such that a lug 139 will be arrested at different stages of its travel according as it engages different parts of a stop face. As already explained, it is desirable that a heel, when in operative position, stand with a corner of its toplift approximately in the line of travel of the breasting knife. In moving heels from preliminary to operative position with relation to a curved knife, it is evident that a heel having a wide breast would require to be advanced, to bring a corner beneath the curve of the knife, a greater distance than would be necessary for a narrow heel; and in order to insure that heels of varying widths shall be arrested when they have moved exactly the proper distances, the stop faces 140′ and 140² are so shaped that a tripper engaging a narrow heel will be arrested earlier in its travel, than would occur if it engaged a wide heel with a consequent greater lateral displacement of its lug 196 such as to contact with a different part of a face 140′. In this manner, the travel of each tripper is rendered variable to suit the requirements of heels of different widths. It is true of course that a tripper hook and its engaged heel continue to travel after a lug 139 has engaged a stop face 140′, but this continued travel never varies since it is limited by contact of the ear 125 (Fig. 10) on the tripper shank 95 with the stop collar 126′ on the then stationary casing 96; and therefore any variation of the travel of the casing 96 effects a like variation in travel of the tripper hook and its engaged heel. When the ear 125 abuts against the stop collar 126′, the entire tripper comes definitely to rest and thereby contributes to determine the operative position of a heel in relation to the breasting tool.

As already suggested, the movement of the slide 95 after the casing 96 has become stationary, serves to depress the pin 132 and thereby to throw the clutch and start the machine. Referring now to Figs. 3, 4 and 8, the lower extremity of the pin 132 is normally in contact with one end of a bell-crank 141, fulcrumed at 142 to the presser foot. When the pin 132 is depressed, as described, the bell-crank 141 is rocked contra-clockwise in Fig. 3. Pivoted to the bell-crank lever at 143 is a plunger 144, seated in a recess in the presser foot and encircled by a spring 145 tending normally to rock the bell-crank clockwise in Fig. 3 and to hold it in contact with the pin 132. Depression of the pin 132, however, rocks the bell-crank and moves the plunger 144 to the left in Fig. 3, so that it pushes against and rocks a starting lever 146 (Fig. 4), fulcrumed at 147 to the frame of the machine. As shown in Fig. 4, the starting lever 146 is connected by a link 149 to the swinging end of a shipper yoke 150 (see also Fig. 11), which is journaled to rock on a vertical axis supplied by a pin 151 (see also Fig. 11) mounted in ears 152, 152 on a vertically reciprocating tool actuating slide 204. By this organization the yoke 150 is provided with vertical reciprocation in unison with the breasting tool slide; and upward movement of the yoke after the tool has completed the breasting operation is utilized for disengaging the clutch and stopping the machine. Reciprocation of the link 149 rocks the yoke 150 on its vertical pivot. The upper arm of the yoke 150 (Fig. 11) has an ear 153 which normally underlies one end of a shipper-rod 154, fulcrumed to the frame of the machine at 155. The opposite end of the shipper-rod lever 154 is connected by a pin 156 to the clutch shipper-rod 90. Evidently, when the lever 146 is rocked clockwise in Fig. 4 the yoke 150 will also be rocked clockwise in said figure, and thereby the ear 153 (Fig. 11) will be withdrawn from beneath the lever 154, releasing the spring 157 (Fig. 15) to elevate the shipper-rod 90 and permit engagement of the clutch for starting the machine. To summarize:—During the forward movement of the shoe from preliminary to operative position, a pin 132 is forced downwardly to rock the bell-crank 141 (Fig. 3) contra-clockwise. This movement of the bell-crank 141 rocks the starting lever 146 (Fig. 4) clockwise and thereby removes ear 153 (Fig. 11) from beneath the lever 154 to permit spring 157 (Fig. 15) to elevate the shipper-rod 90. This permits the springs 87 to throw the clutch and start the machine. The manner in which the machine is automatically stopped after the desired breasting operation will be explained hereinafter.

Preferably the trippers are operative only one at a time and they each, when acting, definitely position one corner of a heel in its proper relation to the breasting tool upon arrival of the shoe in operative position. While this single means contributes to assist the operator in properly locating the shoe, it is preferred, as explained hereinbefore, to employ additional means whereby the swing of the shoe in a horizontal plane may be governed so as to determine the angle which the finished breast shall make with the longitudinal median of the heel. This preferred additional means is exemplified in the accompanying drawings by side gages 158 and 159, shows in Figs. 1, 2 and 13. In the particular illustrative embodiment shown, these side gages consist in stops arranged to be placed in position proximate the sole edge of a shoe, so as to supply abutments against which the sole edge may contact. With an arrangement of this sort the shoe may be held against horizontal movement by engaging it at two points to wit:—at a breast corner and at a portion of the sole edge as shown in Fig. 21. While a tripper and a side gage are not mutually indispensable, it is preferred that they coöperate as above described.

The gages 158 and 159 are conveniently arranged to be introduced into operative position one at a time so that when one is in used the other shall not interfere with the manipulation of the shoe. Also, the side gages for the purposes of the specific machine, are arranged to be operated alternately to accommodate alternate right and left shoes as they are introduced to the machine in the ordinary course of its operation. The gage 158 is intended to coöperate with the left side of the sole of a right shoe; and the gage 159 is intended to coöperate with the right edge of the sole of a left shoe (see Fig. 21). The gages are preferably substantially alike, and accordingly it will suffice to describe in detail but one of them. The gage 158 comprises a holder 160, pivoted at 161 between ears 162, 162 depending from a bracket 163 secured to the frame of the machine. The gage moves upon its pivot 161 into and out of operative position, the latter being shown in dotted lines in Fig. 13. The immediate gaging device of the gage 158 consists in a finger 164, laterally adjustable in a slot 165 of the holder 160. The character of this adjustment is such that when the gage finger 164 occupies the operative position indicated by dotted lines in Fig. 13, it may be adjusted horizontally transversely of the machine to vary the position determined by it for a coöperating sole edge. The holder 160 is rocked about its pivot 161, to move the gage finger 164 into and out of operative position, through the agency of a tooth 168 engaging a co-acting tooth 169 on a rack bar 170, arranged to reciprocate endwise in the bracket 163. In like manner to that just described the side gage 159 has a holder 160′ mounted on a pivot 161′, and an adjustable gaging finger 164′. The latter is moved into and out of operative position by means of a tooth 169′ upon the rack bar 170 engaging a recess 171 in the holder 160′.

When the rack bar 170 is moved toward the left in Fig. 13 the gage 158 is moved into the position indicated by dotted lines, and it thus occupies a position to engage the left hand edge of the sole of an inverted right shoe on the work support. When the rack bar 170 is moved reversely toward the right in Fig. 13 the gage 159 will be rotated into an operative position corresponding to that of the gage 158 shown in dotted lines. These operations of moving one or the other of the gages into operative position take place preferably only at the extremes of reciprocation of the rack bar 170; and normally the latter rests in an intermediate position in which neither of the gages is in operative position. At such a time the gages may be held in the full line positions of Fig. 13 by the engagement of their respective teeth with those of the rack bar, the rack bar being maintained in its intermediate position by spiral springs 172, 172, acting upon its opposite extremities. The rack bar 170 is moved from its intermediate position to one or the other of the extremes of its reciprocation by mechanism presently to be described; and when so moved one of its teeth will depart from engagement with the adjacent gage and will be no longer effective to hold the latter in operative position. To continue the gages in inoperative position, the pivot pins 161, 161′ are encircled by torsional springs (not shown) each having its opposite ends secured respectively to the holders 160, 160′ and the frame of the machine in such manner that the spring tends constantly to rock the holders and their gage fingers out of operative position and to hold them as shown in Fig. 13.

The power for shifting the rack bar 170 endwise to the ends just described is obtained from the treadle operated presser foot rod 48. Referring to Fig. 12, the rod 48 has mounted thereon a horizontally sliding block 173, the block being so mounted between collars 174 and 175 on the rod 48, that it accompanies the rod in its vertical movement but is capable of sliding laterally thereon. The block 173 is mounted in a slot 176 of a rectangular slide 177 (Fig. 4), the latter being also confined between the collars 174 and 175 so as to be movable laterally only in relation to the rod 48, in a horizontal plane. The slide 177 is moved thus horizontally by means of a stud 178 (Fig. 4) carried upon the tripper shifter 103, said stud projecting into a vertical slot 179 in the slide 177. As the tripper shifter 103 is reciprocated to introduce the trippers alternately into operative position the block 177 is similarly reciprocated. Secured to the sliding block 177 is a wedge 180 (Fig. 11), which, at one extreme of the horizontal movement of said block, engages while moving vertically with rod 48, a spring pressed lug 181 mounted in a block 182 (Figs. 4 and 11) which slides horizontally in ways 183 on the frame of the machine. Pivoted to the block 182 is a bearing 185 inclosed in a slot 186 at one end of a lever 187 which is fulcrumed at 188 to the frame of the machine. The lever 187 has a sliding pivot 189 connecting it to a second lever 190 fulcrumed at 191 and having a second sliding pivot 193 by which it is attached to the rack bar 170.

Referring now to Fig. 11—when the rod 48 is moved upwardly by depression of the treadle the wedge 180 will move the spring pressed lug and its block 182 toward the left, rocking the levers 187 and 190 (Fig. 4) in such manner as to move the rack bar 170 toward the left and thus bring the gage 158 into operative position. So long as the tripper shifter 103 remains at the left hand extremity of its reciprocation in Fig. 4 the wedge 180 will remain in position to act upon the lug 181 and accordingly each depression of the treadle during this state of affairs will tend to move the rack bar 170 toward the left. When, however, the tripper shifter 103 moves to the right extreme of its reciprocation (Fig. 4) it will carry with it—by means of the lug 178—the slide block 177, which will therefore convey the wedge 180 into operative relation with a second spring pressed lug 194 on the slide block 182. Thereupon, the next upward movement of the rod 48 will move the block 182 in a direction opposite that of its preceding movement and will oppositely rock the levers 187 and 189 so as to move the rack bar 170 toward the right in Fig. 4 to the extreme of its reciprocation and withdraw the side gage 158 from operative position and to introduce the side gage 159. In this manner, the operation of one or the other of the side gages may be made to depend upon the presence in operative position of the appropriate tripper hook, so that whichever of the latter is about to be used, the proper side gage to coöperate therewith will be presented in operative position.

Heretofore the manner in which the various adjustments of the work are effected has been explained. It remains to consider the construction and mode of operation of a convenient form of breasting tool shown herein as a knife 195.

Referring to Fig. 3—the knife 195 has a holder 196, secured to a slide 241 by a clamp plate 242 held in place by a set screw 243ˣ engaging a cap 223 carried by the slide 241. The slide 241 is mounted immediately upon the breasting tool slide 59 by means of a vertical screw 198, which may be turned to adjust the slide 241 vertically by means of a pinion 199 and gear 200, the latter of which is formed on the hub of a handle wheel 201, rotatable upon the stud 202 carried in the breasting tool slide 59. In practice, the knife 195 may become dulled, and when it is sharpened it is to some extent ground away and demands to be adjusted slightly to compensate for its decreased length. This is provided for by an adjustment independent of that of the slide 241 on the plunger 59 so that the compensating adjustment may be effected without changing the relation of the knife to its actuating mechanism. This is accomplished by a slide 243 in ways 244 formed in the plunger 59. The lower end of the slide 243 bears against the upper end of the holder 196 and is reciprocable vertically by means of a worm pinion 246 and a worm rack 247. The worm pinion 246 is journaled upon a stud 248 in ears 249′, 249′, on the slide 241. When the slide 243 is properly adjusted the knife holder 196 may be moved into contact therewith and there secured by the set screw 243ˣ. The knife 195 is moved downwardly to cut the work, primarily by means actuated positively by the power of the machine; but to facilitate the arrest of the knife in sufficient season to prevent its cutting beyond the intended scope of its breasting operation, a yielding cushion or the like is interposed between the knife and its primary power actuating mechanism.

Referring now to Figs. 1, 2 and 17, the actuating mechanism for the knife comprises a vertically moving head 204, having ears 205 and 206, encircling vertical guide rods 207, 207 rigidly mounted in the frame. The head 204 is reciprocated vertically by an eccentric 208 (Fig. 2) on the main shaft 45, having an eccentric strap 209 connected by a link 210 to a pin 211 mounted in the bottom of the head 204. As shown in Fig. 18 the breasting tool slide 59 has ears 213 and 214 also mounted on the guide rods 207. Encircling each of the rods 207 is a spiral spring 215 interposed between an ear 214 on the knife plunger 59 and an adjusting nut 216, which threads onto a sleeve 217 fixed to one of the ears 205 on the head 204 by means of a pin 219. A lock nut 218 is supplied for locking the adjusting nut 216 in adjusted position. Evidently, when the head 204 is vertically reciprocated it tends, through the agency of the springs 215 to depress the breasting tool slide 59; but if the descent of the latter be positively interrupted the springs 215 will yield to permit such arrest in spite of the continued descent of the head 204.

While the shoe stands in adjusted position preceding the actual breasting operation one of the tripper hooks engaging a corner of the toplift may be substantially in the path of the knife; and under these circumstances the tripper should be withdrawn before the knife descends far enough to strike it. This is provided for in the specific machine by so timing the knife eccentric 208 and the tripper cam 106 (Fig. 16) that the latter enters upon its dwell and moves the tripper shifter into intermediate position, to withdraw the tripper before the eccentric has moved far enough materially to lower the knife. This withdrawal of the tripper permits it to move endwise rearwardly to its normal position and thereby disorganize the train of detaining mechanism which originally moved the clutch controlling yoke 150 (Fig. 4) into inactive position to start the machine, and there held it out of engagement with the shipper lever 154 (Fig. 11). In this manner the yoke 150 is freed to the action of the spring 149 (Fig. 4) which rocks the yoke back to its normal position shown in Fig. 4. When this occurs the reciprocating head 204 (on which the yoke 150 is mounted) has already descended somewhat so that the return of the yoke to normal position places it beneath the lever 154. Hence when the head 204 ascends again the ear 153 of the yoke rocks the lever 154 clockwise in Fig. 11 and depresses the shipper rod 90 to disengage the clutch and stop the machine.

As set forth in the introductory portion of this specification, it is important that the cutting action of the knife be promptly and accurately arrested at the completion of the breasting operation; and this is effected upon the illustrative machine shown in the drawings through the agency of a breasting stop in the form of a shield 220. The specific shield 220 occupies normally an inactive position, not in contact with the shoe, as shown in Fig. 3; but when the operator moves the shoe forward from intermediate to operative position, and when the knife begins its downward movement said shield moves into contact with the sole of the shoe, and thereby measures preliminarily, by reference to the sole, the degree of descent which shall thereafter be permitted to the breasting knife.

The shield 220 is preferably mounted at the lower extremities of guide arms 221 (Fig. 2) arranged to slide vertically partly in ways 222 on the breasting tool slide 59 (Fig. 6), said arms being guided by a cap plate 223.

Referring now to Fig. 5, the arms 221 and shield 220 are held normally in inactive position by means of spring pressed pins 224, having tapered ends to engage teeth 225 upon the arms 221. The pins are mounted in appropriate bearings on the breasting tool slide 59 and are moved out of engagement with the teeth 225 by means of trip levers 227, fulcrumed on pins 228 projecting from the slide 59. The trip levers 227 are bell-cranks and each engages with one arm a pin 224, while the other arm engages a projection at the lower end of a finger 229, pivoted at 230 to the frame of the machine. A spring 231 holds the finger 229 normally in engagement with the bell-crank trip lever 227. When the breasting tool slide 59 begins its descent it carries with it the lever 227, but the finger 229 remains stationary, being pivoted to the frame of the machine. Consequently, in the descent of the lever 227 with the slide 59 the former is rocked clockwise in Fig. 5, thereby withdrawing the pins 224 and permitting the shield 220 and its arms 221 to drop by gravity until the arrester takes up its position in contact with the sole of the shoe. During farther descent of the slide 59 the shield 220 is rigidly clamped to the frame of the machine, so that it comes to be rigidly supported independently of the shoe.

Referring now to Fig. 2, the ways in which each of the guide arms 221 reciprocates are supplied in part upon one side by ribs 232 integral with the machine frame. On the opposite side of each arm 221, opposite to a rib 232, is positioned a clamp arm 233, pivoted at 234 to the frame of the machine, and split longitudinally for a short distance from its lower end. Each clamp arm has an outwardly and downwardly extended cam face arranged to be engaged by a roller 235, journaled upon an arm 236 pivotally mounted on the breasting tool slide 59. Springs 238 carried by the breasting tool slide and bearing against the under sides of the arms 236, tend to hold the friction rolls 235 in contact with the clamp arms 233. When the breasting tool slide 59 begins its descent the shield 220 immediately drops and takes up its knife arresting position. Hence, during the continued descent of the slide 59 the arms 221 are stationary as, of course, are also the clamp arms 233 and ribs 232, the last named parts being on the machine frame. Thus, as the slide 59 descends, carrying with it the cam rolls 235, it presently acts to clamp the arms 221 rigidly to the machine frame and to hold them clamped during the remaining descent of the knife.

When the knife completes its breasting operation a bunter 239 (Fig. 3) rigidly connected to the breasting tool slide 59, abuts against the shield 220 and positively arrests the knife against further movement. The bunter 239 is adjustably secured to the cap plate 223, which, in turn, is connected to the vertically adjustable slide 241. By vertically adjusting the bunter 239 it is possible to alter the relative positions of the knife edge and the lower face of the shield 220, and, by the same means, to adjust the knife edge (as to its final cutting position in relation to the shoe sole) so as to insure that the shoe sole shall not be cut by the knife.

When the knife has descended for breasting the heel, carrying with it the pins 224 (Fig. 5), said pins enter into renewed engagement with the ratchet teeth on the shield arms 221; and upon the reascent of the knife said arms and the shield 220 are elevated into inoperative position where they remain in readiness to be released as above described for another breasting operation.

By the different adjustments of the knife hereinbefore described it will be seen that rotation of the handle 201 (Fig. 3) will adjust vertically the slide 241 and all of its associated parts, to wit—the knife holder slide 196, the knife 195, and the bunter 239. If it is desired to adjust the knife independently—as to compensate for wear or the like—this may be effected by rotating the worm pinion 246. If it be desired to alter the final position of the knife in which it shall stop at the end of a breasting operation, this may be done by adjusting the bunter 239 by means of its collar 249 fixed thereupon.

It will facilitate an understanding of the illustrative machine shown in the drawings to review, in their proper sequence, the various steps involved in breasting a heel on said machine.

It is the operator's first duty to ascertain whether the trippers are positioned to receive a right or a left shoe of a pair. If the left hand tripper 92 stands in operative position (dotted lines Fig. 7) he should introduce a left shoe; and if the right hand tripper 91 stands in operative position (full lines Fig. 7) he should introduce a right shoe. One or the other of the trippers was left in operative position upon last stopping the machine. Next, the operator places the appropriate shoe of a pair upon the work support when the latter stands in the position shown in dotted lines in Fig. 1; and, rocking the work support on its pivot, pushes the shoe into preliminary position indicated by full lines in Fig. 3. He then depresses the treadle to move the presser foot 66 down upon the heel and thereby (Fig. 14) the presser-block 76 is moved upwardly into its recess, elevating the pins 122 and 122′ to permit the tripper hook to move into complete operative position in front of the heel or toplift breast. The movement of the treadle serves also (Figs. 4 and 11) to elevate the wedge 180 thereby rocking the levers 187 and 190 and moving the rack bar 170 to present the appropriate side gage 159 or 160 in position to engage a side of the shoe sole. This enables the operator to arrange the shoe properly in a horizontal plane by swinging it until it is arrested by the side gage. The treadle actuated pressure of the presser foot serves preliminarily to move the shoe until the heel tread-face occupies that angle to the horizontal which is intended to be determined by the angular adjustment of the presser foot or of the jack head 29, or both. When the presser foot is finally depressed by power the shoe is firmly clamped in the desired angular position. The operator next draws the shoe forward carrying the tripper with it until, just as the tripper is arrested (with the shoe in the operative position shown in Fig. 1), the machine is started automatically.

The first power operation of the machine consists in forcing the presser foot down upon the heel to clamp it firmly in its then adjusted position. Immediately after this has been effected the tripper is withdrawn to leave a clear path for the knife and to disorganize the clutch shipper detaining mechanisms. During these operations the knife has descended slightly and the shield 220 has been permitted to drop and take up its operative position resting on the shoe sole. At this stage all the adjustments of the machine have been completed. The heel has been adjusted with regard to its tread angle, its median angle, and the spacing of its breast from the rear of the heel; and extent of the cutting action of the knife has been adjusted, so to speak, by the preliminary measuring movement of the shield 220. Hereupon ensues the actual breasting operation which is arrested by the bunter 239 contacting with the shield 220. The knife is returned to its normal elevated position by its eccentric and during its ascent it carries with it the shield 220. As the knife head reaches its normal position the yoke 150 by its finger 153 engages and rocks the shipper lever 154, depresses the shipper rod 90, and disengages the clutch to stop the machine. As the machine comes to rest, the presser foot cam releases its pressure on the heel and permits the treadle elevating spring (Fig. 1) to retract the wedge 34 (when the treadle is released) and return the presser foot to normal position. At substantially the same time, the tripper cam 106 completes a movement of the tripper shifter 103 to one of the limits of its reciprocation so as to introduce the appropriate tripper for another shoe. This same movement of the tripper shifter 103 moves the block 177 (Figs. 4 and 11) so as to withdraw its pin 181 or 194 from engagement with the wedge 180, and permit the springs 172, 172 to move the rack 170 into intermediate position so that both side gages 159 and 160 stand then in inoperative position. When the machine stops its parts are in readiness to receive another shoe the reverse of the one last breasted, that is to say, to receive a right shoe if the one last breasted was a left, and vice versa.

The preceding description is sufficient to explain one practicable embodiment of the invention employing various features of the invention coöperatively. No attempt has been made to suggest the various organizations and modes of operation to which the invention and its several features may be applied, either individually or otherwise, since the adaptability of the invention will be readily apparent to those skilled in the art, and the proper scope of the said features is indicated in the subjoined claims, which, of course, are not to be limited essentially to the specific exemplary embodiment disclosed.

What is claimed is:—

1. In a breasting machine, the combination of a movable shoe rest; a knife; a tripper adapted to engage the heel of a shoe supported on said shoe rest and movable therewith; and instrumentalities actuated by said tripper to operate said knife.

2. In a breasting machine, the combination of a movable shoe rest; a knife; a presser-foot adapted to rest against the heel of a shoe supported on said shoe rest; a tripper supported on said presser foot and movable relatively thereto, said tripper being arranged to engage the heel of said shoe and movable therewith; and instrumentalities actuated by said tripper to operate said knife.

3. In a breasting machine, the combination of a shoe rest; a knife; a tripper; and mechanism to move said tripper into engagement with the heel of a shoe supported on said rest prior to every alternate cutting movement of said knife.

4. In a breasting machine, the combination of a shoe rest; a knife; a pair of trippers; and mechanism to move each of said trippers alternately into engagement with the heel of a shoe supported on said rest prior to every alternate cutting movement, respectively, of said knife.

5. In a breasting machine, the combination of a shoe rest; a knife; a tripper; an edge gage; and mechanism to move said tripper into engagement with the heel and said edge gage into engagement with the edge of the sole of a shoe supported on said rest prior to every alternate cutting movement of said knife.

6. In a breasting machine, the combination of a shoe rest; a knife; a pair of trippers; a pair of edge gages; and mechanism to move each of said trippers alternately into engagement with the heel and each of said edge gages alternately into engagement with the edge of the sole of a shoe supported on said shoe rest, prior to every alternate cutting movement, respectively, of said knife.

7. In a breasting machine, the combination of a shoe rest; a movable knife carrier; a knife fast to said carrier; a stop to limit the movement of said knife, said stop being arranged to contact with the sole of a shoe supported on said rest; means to hold said stop out of contact with said shoe; and mechanism to release said stop and allow the same to move into contact with the sole of said shoe.

8. In a breasting machine, the combination of a shoe rest; a movable knife carrier; a knife fast to said carrier; a stop to limit the movement of said knife, said stop being arranged to contact with the sole of a shoe supported on said rest; means to hold said stop out of contact with said shoe; mechanism to release said stop and allow the same to contact with the sole of said shoe; and means to lock said stop against movement when in contact with the sole of said shoe.

9. In a breasting machine, the combination of a shoe rest; a movable knife carrier; a knife fast thereto; a stop to limit the movement of said knife, said stop being arranged to contact with the sole of a shoe supported on said rest; means to hold said stop out of contact with said shoe; and instrumentalities operated by the movement of said knife carrier to release said stop and allow the same to contact with the sole of said shoe.

10. In a breasting machine, the combination of a movable shoe rest; a knife; a tripper adapted to engage the heel of a shoe supported on said shoe rest and movable therewith; instrumentalities actuated by said tripper to operate said knife; a stop arranged to engage said tripper during its forward movement, whereby the final location of said shoe relatively to the knife is determined; and means to arrest the forward movement of said shoe rest when said shoe is so located.

11. In a heel breasting machine, the combination of breasting means; a breasting stop to contact with the work; and means to support the stop independently of the work, while the stop arrests the operation of the breasting means.

12. In a heel breasting machine, the combination of breasting means; and means to arrest the operation thereof including an automatically-adjustable stop, and means to support it independently of the shoe while performing its arresting office.

13. In a heel breasting machine, the combination of breasting means; a breasting stop; means adapted to cause the breasting stop to move into contact with the work in advance of the breasting means; and means to support said stop independently of the shoe and breasting means to arrest the operation of the latter.

14. In a heel breasting machine, the combination of a breasting tool; means for causing the tool to shape a heel breast; and means for positively arresting the breasting tool, including an adjustable breasting stop and means to hold it stationary preparatory to its arresting operation.

15. In a heel breasting machine, the combination of a breasting tool; means for causing the tool to shape a heel breast; a stop automatically adjustable by reference to the shoe to arrest the operation of the tool; and means independent of the shoe for supporting the stop during the performance of its arresting office.

16. In a heel breasting machine, the combination of a breasting knife; a work support; means for moving them relatively toward each other; a breasting stop to arrest said relative movement; and means independent of the work to hold the breasting stop stationary preparatory to its arresting operation.

17. In a heel breasting machine, the combination of a work support; a breasting knife; means to move them relatively toward each other; a breasting stop relatively adjustable to contact with the work preparatory to the effective operation of the breasting knife; means for supporting the breasting stop, in its adjusted relation, independently of the shoe; and means controlled by the relative adjustment of the stop and work, for arresting the operation of the knife.

18. In a heel breasting machine, the combination of a shoe support; a knife; a bunter movable with the knife; a stop for the bunter movable into contact with the shoe sole to assume a position determined by the thickness of the stock; and means to support the stop independently of the shoe to arrest the bunter and knife.

19. In a heel breasting machine, the combination of breasting means; a breasting stop to contact with the shoe and automatically adjustable to predetermine the extent of operation of said means to suit a given heel; automatic means to cause said stop to adjust itself to the requirements of the work, and means independent of the work to sustain said stop and relieve the shoe of pressure by the stop during the action of the breasting means.

20. In a heel breasting machine, the combination of breasting means; a breasting stop constructed and arranged to contact with the work; and means to clamp the stop to the frame of the machine, to sustain the stop.

21. In a heel breasting machine, the combination of breasting means; an automatically adjustable breasting stop; and means to clamp it in adjusted position to the frame of the machine.

22. In a heel breasting machine, the combination of breasting means; a breasting stop to arrest the cutting action of the breasting means; means to cause said stop to move into contact with the shoe sole; and means to then support the stop from the frame of the machine to arrest the breasting means and relieve the shoe sole from pressure of the breasting stop.

23. In a machine for operating upon the heels of boots and shoes, the combination of a heel treating device; and means for presenting a shoe to said device, including a fore-part gage against which the side of the shoe may be swung relatively to position the shoe and device and means dependent upon the operation of the machine to move the gage to gaging position.

24. In a machine for operating upon the heels of boots and shoes, a heel treating device; and automatically acting shoe contacting means at the side of the shoe to determine right and left alinements of the shoe.

25. In a machine for operating upon the heels of boots and shoes, the combination of a heel treating device; work-contacting gaging surfaces at the side of the shoe to determine right and left angular adjustments of shoes and means constructed and arranged for automatically moving a gaging surface into gaging position upon starting the machine.

26. In a machine for operating upon boots and shoes, the combination of a shoe treating device; gaging devices constructed and arranged to act upon the side of the shoe to determine respectively right and left relative angular adjustments of shoes and treadle means operative to move a gaging device into gaging position.

27. In a machine for operating upon boots and shoes, the combination of gaging devices constructed and arranged to contact singly with the sides of a shoe to determine right and left angular adjustment of boots and shoes, and means for moving said gaging devices the one into and the other out of gaging position.

28. In a machine for operating upon the bottoms of boots and shoes, the combination of a tool; relatively movable right and left gages to determine respectively right and left relative angular adjustments of shoes and the tool; and means to move the said right and left gages away from the shoe to permit free manipulation of the shoe.

29. In a machine for operating upon boots and shoes, the combination of gaging means constructed and arranged to act at the side of a boot or shoe to determine a right or left relative angular adjustment thereof; and means controlled by the operation of the machine to withdraw the gaging means from operative position.

30. In a machine for operating upon boots and shoes, the combination of alternately operable gaging devices to contact with the side of a shoe to determine a right or left relative angular adjustment thereof, and means constructed and arranged to maintain said gaging devices normally away from the shoe to permit free manipulation of the latter.

31. In a machine for operating upon boots and shoes, the combination of a tool; a work-contacting device to determine a right or a left angular adjustment of a shoe and the tool; and means to move the gaging device upwardly and laterally away from the shoe to permit free manipulation of the latter.

32. In a machine for operating on boots and shoes, the combination of gaging devices constructed and arranged to act upon the side of a boot or shoe and movable alternately to and from operative positions, to determine right and left relative angular adjustments of shoes, and means under the control of the operator for moving one of said gaging devices into operative position.

33. A machine for operating upon the heels of boots and shoes comprising, in combination, working devices; a shoe support; gages constructed and arranged to permit a shoe to be moved therebetween laterally to predetermine its alinement at the forepart relative to the heel working devices by reference to one or the other of said gages bearing against the side of the shoe, and means for moving said gages into and out of operative gaging position.

34. A machine for operating upon the bottoms of boots and shoes comprising, in combination, working devices; a shoe support; gages to contact with right and left shoes, respectively, to determine relative alinement of said shoes and the working devices; and means to present said gages alternately to operative position.

35. In a machine for operating on the bottoms of boots and shoes, the combination of working means; gaging means by which to locate a breast corner; and right-and-left-adjustment determining means to position a shoe angularly about said corner as an axis.

36. In a machine for operating upon the heels of boots and shoes, the combination of a tool; gages alternately movable into operative position for determining right and left relative angular adjustments of the work and the tool; and means to determine an inclined relation in which the tool shall act upon the work.

37. In a machine for operating upon the heels of boots and shoes, the combination of a tool; work-contacting forepart gages to determine respectively right and left relative angular adjustments of the work and the tool; and means to determine an inclined relation in which the tool shall act in respect to the work and thereafter to secure said work in the position determined by said means and by said gages.

38. In a machine for operating on the bottoms of boots and shoes, the combination of working means; pairs of coöperating gages, each pair comprising a breast gage and a side gage; and automatic means to introduce and withdraw a pair to and from operative position.

39. In a machine for operating on the bottoms of boots and shoes, the combination of working means; pairs of coöperating gages, each pair comprising a breast gage and a side gage; and automatic means to introduce the pairs alternately into operative position.

40. In a machine for operating on the bottoms of boots and shoes, the combination of working means; combined means for gaging the work and starting the power operation of the machine; and means operable, upon the starting of the machine, to withdraw said combined means from operative position.

41. In a heel breasting machine, the combination of a curved knife; gaging means to locate a breast corner under the knife; and automatic means for varying the operation of the gage to locate the corners of different sized heels under different parts of the curve of the knife.

42. In a machine for operating on the bottoms of boots and shoes, the combination of working devices to act along a curved line; a work gaging device movable to gage pieces of work of different dimensions; and compensating means to determine a definite relation between the gaging device and the curved line, irrespective of the aforesaid movement of the former.

43. In a heel breasting machine, the combination of a presser-plate having a gaging edge; a work support; means controlled by the operator to move the presser-plate to seat the presser-plate on the work while leaving the latter sufficiently free to be adjustable; and power means to clamp the presser-plate against the work prior to the action of the breasting means.

44. In a machine for operating upon the bottoms of boots and shoes, the combination of working devices; a shoe support; a pressure surface to coöperate with the shoe support for holding a shoe between them; gaging means for the shoe; means for moving one or the other of said gaging means into gaging position to determine the right or left swing of the shoe; treadle controlled means for seating the shoe against the pressure surface preparatory to adjustment of the shoe to the gaging means; and power means to clamp the shoe when adjusted, between the shoe support and pressure surface.

45. In a heel breasting machine, the combination of a knife; relatively movable members having opposed pressure sustaining surfaces to hold a heel between them; a breast gage for positioning the heel relatively to the knife; latching means, for holding the gage out of its complete operative position, arranged to be tripped by relative movement of said members, one toward the other.

46. In a heel breasting machine, the combination of a work support; yieldingly actuated breasting means; and means acting independently of the work to arrest the operation of said breasting means at a point automatically determined by the thickness of the shoe material.

47. In a heel breasting machine, the combination of a work support; a breasting device; actuating means therefor; and means receiving support independently of the work to arrest movement of the breasting device at a point determined by the thickness of the sole material.

48. In a machine for operating upon the bottoms of boots and shoes, the combination, with working means, of a shoe support, a plurality of alternately operable side gages alternately movable toward and from said support, and means whereby the limits of movement of said gages may be adjusted.

49. In a machine for operating upon the bottoms of boots and shoes, the combination, with working means, of means positioning a shoe relative to said working means comprising alternately operable positioning devices alternately movable into and out of operative position, and mechanism for causing alternate movement of said positioning devices.

50. In a machine for operating upon the bottoms of boots and shoes, the combination, with working means, of means for positioning a shoe relative to said working means comprising a plurality of alternately operable normally inoperative gages, and mechanism whereby said gages may be alternately brought into operative position.

51. In a machine for operating upon the bottoms of boots and shoes, the combination, with working means, of means for positioning a shoe relative to said working means comprising a pair of positioning devices, actuating mechanism for moving said devices into operative position, and operative connections between said devices and mechanism whereby when said mechanism is actuated in one direction one of said devices is moved into operative position, and when said mechanism is actuated in the opposite direction the other of said devices is moved into operative position.

52. In a machine for operating upon the bottoms of boots and shoes, the combination, with working means, of means for positioning a shoe relative to said working means comprising a plurality of alternately operable positioning devices alternately movable into and out of operative position.

53. In a machine for operating upon the bottoms of boots and shoes, the combination, with working means, of means for positioning a shoe relative to said working means comprising a plurality of alternately operable positioning devices alternately movable into and out of operative position, and means constructed and arranged for actuation by the operator for causing said alternate movement.

54. In a machine for operating upon the bottoms of boots and shoes, the combination, with working means, of a plurality of positioning devices each of which is alone adapted to position a shoe relative to said working means, and devices for moving said positioning devices the one into and the other out of operative position.

55. In a breasting machine, the combination of a shoe rest; a movable knife carrier; a knife carried thereby; means in constant operative engagement with said knife carrier for actuating the same; a stop adapted to contact with the shoe upon the shoe rest; and means controlled by said stop to determine the knife movement, said means transmitting the energy of the knife carrier actuating means to the machine frame.

56. A machine for operating upon heels having, in combination, a frame, a shoe support connected to said frame, an operating tool, said shoe support and tool being arranged for relative movement transversely of the path of the tool to move the shoe and tool relatively into and out of operative relation to each other, and means for limiting relative movement of said parts into operative relation controlled in accordance with the width of the heel of the shoe carried by said support.

57. A heel breasting machine having, in combination, a breasting knife, a support for sustaining a shoe with its heel in the path of the knife arranged for movement into and out of operative relation to the knife, a shoe positioning device having means for limiting movement of the shoe into operative position controlled in accordance with the size of the shoe, and a supporting member for the positioning device adapted to engage the tread surface of the heel of the shoe, said member being arranged for adjustment to force said member against the tread surface of said heel.

58. A heel breasting machine having, in combination, a breasting knife and a shoe support arranged for movement to position a shoe in operative relation to the knife and for swinging movement of the shoe to permit the shoe to be sustained with the longitudinal median line of its heel in oblique relation to the knife, means for limiting movement of the shoe into operative position, and other means for limiting such swinging movement in opposite directions respectively.

59. A shoe machine having, in combination, a shoe support for supporting a shoe from a point exterior of the shoe to be treated, an operating tool, said shoe support and tool being arranged for relative movement into and out of operative relation in the direction of the length of the shoe, and means controlled by the shoe for limiting the relative movement of said parts into operative relation.

60. In a machine for working on the bottoms of boots or shoes, the combination of operating means, means for supporting a boot or shoe in a stationary position during operation of the operating means thereon, and gages adapted to be engaged by the forepart of the boot or shoe each to the exclusion of the other to determine the right or left angular adjustment thereof relative to the operating means.

61. In a machine for operating on the bottoms of boots and shoes, the combination of means for supporting a shoe in stationary position for treatment and side gages for contacting with the sides of the shoe, each of which is operative to the exclusion of the other, to determine right or left angular location of the shoe.

62. In a machine for treating boots and shoes, the combination of a tool and means for relatively positioning the boot or shoe and tool, comprising a hooked finger extending from the rear forwardly and engaging a corner of the heel breast to determine the longitudinal position of the boot or shoe relatively to the tool, and a shoe support movable independently of said finger to cause the heel breast to engage the finger.

63. In a machine for treating boots and shoes, the combination of a tool and means for relatively positioning the tool and boot or shoe, comprising a hooked finger mounted to swing about an axis at the rear and extending forwardly to engage a corner of the heel breast to determine the longitudinal position of the boot or shoe relatively to the tool, and a shoe support movable independently of said finger to cause the heel breast to engage the finger.

64. In a machine in which a shoe and an operating tool are relatively positioned before the shoe is operated upon, means including a shoe support connected to the machine frame for movement with the shoe for positioning the shoe relatively to the tool, and means for limiting relative approaching movement of the shoe and the tool in the direction of one dimension of the shoe, means for measuring the shoe along another dimension and means controlled by said measuring means for adjusting said limiting means.

65. A machine for operating upon heels, having in combination, an operating tool, a shoe support connected to the machine frame for movement into and out of the range of said tool, a stop for limiting movement of the shoe with said support into the range of the tool, and means for adjusting said stop controlled in accordance with the width of the heel carried by the shoe.

66. A machine for operating upon shoes, having in combination, an operating tool, a laterally rigid work support, a stop for limiting relative approaching movement of the shoe and tool in the direction of the length of the shoe, means engaging at one side only of the shoe for measuring a shoe presented to the machine and means controlled by said measuring means for adjusting the stop.

67. A heel breasting machine having in combination, a breasting knife, a shoe support for sustaining a shoe in the path of the knife constructed to permit the shoe to be sustained with the longitudinal median line of its heel in an oblique relation to the knife, means contacting with one end of the heel for preventing lateral movement of that end of the heel, and gages for limiting lateral movement of the other end of the heel in opposite directions respectively.

68. In a machine of the class described a slide having a gage for limiting the movement of a shoe in the direction of its length, a second slide provided with a stop-surface extending obliquely to the line of movement of the first slide, a stud carried by said first slide arranged for engagement with said stop-surface and means for adjusting said second slide in accordance with the size of the shoe presented to the machine.

69. A shoe positioning device, having in combination, a stop for limiting movement of a shoe in the direction of its length, means for measuring a shoe presented to the device constructed to restrain lateral movement of the breast end of the heel of the shoe, means controlled by said measuring means for adjusting the stop and means for limiting lateral movement of the rounded end of the heel in opposite directions respectively.

70. A shoe positioning device, having in combination, a slide having provision for engaging a shoe, a stop for limiting movement of the slide arranged to be adjusted in accordance with the size of the shoe presented to the device and means for varying the effective length of said slide.

71. A shoe positioning device, having in combination, a stop for limiting movement of a shoe into operative position, adjustable to vary the limit of movement of the shoe, means for adjusting the stop in accordance with the size of the shoe presented to the device and means whereby the relation between the size of the shoe and the adjustment of the stop may be varied to suit different requirements.

72. A shoe positioning device having in combination, means contacting with one end of the heel for preventing lateral movement of that end of a heel, and gages arranged to permit a limited lateral movement of the other end in opposite directions respectively.

In testimony whereof I have hereunto set my hand in the presence of two subscribing witnesses.

MERTON D. PHELAN.

Witnesses:
BEATRICE I. SMITH,
EDITH C. HOLBROOK.

Copies of this patent may be obtained for five cents each, by addressing the "Commissioner of Patents, Washington, D. C."